(12) United States Patent
Patil et al.

(10) Patent No.: US 12,526,426 B2
(45) Date of Patent: Jan. 13, 2026

(54) TRACKING SAMPLE COMPLETION IN VIDEO CODING

(71) Applicant: QUALCOMM Incorporated, San Diego, CA (US)

(72) Inventors: Gaurav Avinash Patil, San Jose, CA (US); Kapil Garg, Fremont, CA (US); Rajesh Chowdary Chitturi, San Jose, CA (US); Prasanth Gomatam, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 36 days.

(21) Appl. No.: 18/758,697

(22) Filed: Jun. 28, 2024

(65) Prior Publication Data

US 2024/0357121 A1 Oct. 24, 2024

Related U.S. Application Data

(63) Continuation of application No. 17/815,486, filed on Jul. 27, 2022, now Pat. No. 12,063,367.

(51) Int. Cl.
*H04N 19/132* (2014.01)
*H04N 19/176* (2014.01)
*H04N 19/423* (2014.01)
*H04N 19/46* (2014.01)

(52) U.S. Cl.
CPC ......... *H04N 19/132* (2014.11); *H04N 19/176* (2014.11); *H04N 19/423* (2014.11); *H04N 19/46* (2014.11)

(58) Field of Classification Search
CPC .. H04N 19/427; H04N 19/176; H04N 19/423; H04N 19/46; H04N 19/436
See application file for complete search history.

(56) References Cited

U.S. PATENT DOCUMENTS

| 10,277,913 | B2 | 4/2019 | Kwon et al. |
| 12,063,367 | B2 | 8/2024 | Patil et al. |
| 2007/0186143 | A1 | 8/2007 | Gubbi et al. |
| 2009/0002379 | A1 | 1/2009 | Baeza et al. |
| 2009/0016619 | A1 | 1/2009 | Todoroki |
| 2009/0113174 | A1 | 4/2009 | Wolf et al. |
| 2012/0082240 | A1 | 4/2012 | Takada et al. |

(Continued)

OTHER PUBLICATIONS

International Search Report and Written Opinion—PCT/US2023/069163—ISA/EPO—Sep. 29, 2023.

(Continued)

*Primary Examiner* — Neil R Mikeska
(74) *Attorney, Agent, or Firm* — Shumaker & Sieffert, P.A.

(57) ABSTRACT

An apparatus configured to decode video data includes a shared memory and one or more processors configured to execute a plurality of video decoding cores. At least one of the plurality of video decoding cores in communication with the shared memory, and each of plurality of video decoding cores are configured to track completion of decoding samples of one or more regions of a frame of video data, write information to the shared memory, the information indicative of the completion of decoding the samples of the one or more regions of the frame of video data, read, prior to decoding a subsequent region of the frame of video data, the information in the shared memory, and determine whether to decode the subsequent region of the frame of video data based on the information.

26 Claims, 18 Drawing Sheets

(56) References Cited

U.S. PATENT DOCUMENTS

2013/0076770 A1  3/2013  Cheng et al.
2019/0087929 A1  3/2019  Lassahn et al.
2022/0394271 A1  12/2022 Horowitz
2024/0040125 A1  2/2024  Patil et al.

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Wang Z., et al., "Dynamic Macroblock Wavefront Parallelism for Parallel Video Coding", Journal of Visual Communication and Image Representation, Academic Press, Inc, US, vol. 28, Jan. 17, 2015, pp. 36-43, XP029143858, abstract, Figure 5, Section 3.

| SETUP | FRAME SIZE | 2D TILE | POINTERS (PTR) CALCULATION | NUM PTRS | BITS PER PTR | PTR X OR X+Y | TOTAL BITS |
|---|---|---|---|---|---|---|---|
| 1: BitMap | | | FW/uW * FH/uH | 64x2048 | 1 | 1 | 131K |
| 2: Rows (Frame) | 4096 x 8192 (FWxFH) | 64 x 4 (uWxuH) | FH/uH | 2048 | 14 | 1 | 28.6K |
| 3: Rows (Core) + Shared | | | ((ctu_H/uH) * Num_Cores) +3 | 131 | 14 | 2 | 3.7K |
| 4: CTU Rows | | | (FH/ctu_H) | 128 | 14 | 1 | 1.8K |
| 5: Core + Shared | | | Num_Cores + 3 | 7 | 14 | 2 | 192 |

FIG. 14

TRACKING SAMPLE COMPLETION IN VIDEO CODING

This application is a continuation of U.S. patent application Ser. No. 17/815,486, filed in the United States Patent and Trademark Office on Jul. 27, 2022, the entire content of which is incorporated herein by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats, such as AOMedia Video 1 (AV1), that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data. In particular, this disclosure describes techniques for tracking the completion of coding (e.g., encoding or decoding) samples and/or pixels of video data in a multicore video coding system.

In some example video coding systems, when performing a prediction process on samples of video data in a current frame, the video coding system may only need to read back samples from previously decoded frames. In this example, all the coded samples were readily available to the video coding system. However, in some video coding systems that implement a codec that supports intra block copy or other similar intra frame coding techniques, the video coding system may be configured to perform a prediction process on samples in a current frame that use other samples in the same frame. Such samples may not be readily available since it is not guaranteed that the portion of the frame needed for performing the prediction process on one sample has already been completed (e.g., already encoded and reconstructed or already decoded). This problem becomes more difficult when multiple regions of a frame are coded in parallel using a multicore video coding system.

To address this problem, this disclosure describes techniques and devices where a video coding core in a multicore video coding system is configured to track the completion of the coding of samples/pixels of video data. The video coding core may write information to a shared memory, where the information indicates the completion of the coding of samples/pixels in a frame of video data. The shared memory is accessible by each video coding cores of the multicore video coding system. In this way, when performing an intra frame prediction process like intra block copy, a video coding core may access the information in the shared memory to determine if the samples/pixels needed for the prediction process have been completed and are available. If yes, the video coding core may continue with the prediction process. If the samples/pixels are not available, the video coding core may wait until information is written to the shared memory indicating the samples/pixels are completed and available.

In one example, this disclosure describes an apparatus configured to decode video data, the apparatus comprising a shared memory, and one or more processors configured to execute a plurality of video decoding cores, each of the plurality of video decoding cores in communication with the shared memory. At least one of plurality of video decoding cores are configured to track completion of decoding samples of one or more regions of a frame of video data. write information to the shared memory, the information indicative of the completion of decoding the samples of the one or more regions of the frame of video data. read, prior to decoding a subsequent region of the frame of video data, the information in the shared memory, and determine whether to decode the subsequent region of the frame of video data based on the information.

In another example, this disclosure describes a method of decoding video data, the method comprising tracking completion of decoding samples of one or more regions of a frame of video data, writing information to a shared memory, the information indicative of the completion of decoding the samples of the one or more regions of the frame of video data, reading, prior to decoding a subsequent region of the frame of video data, the information in the shared memory, and determining whether to decode the subsequent region of the frame of video data based on the information.

In another example, this disclosure describes an apparatus configured to decode video data, the apparatus comprising means for tracking completion of decoding samples of one or more regions of a frame of video data, means for writing information to a shared memory, the information indicative of the completion of decoding the samples of the one or more regions of the frame of video data, means for reading, prior to decoding a subsequent region of the frame of video data, the information in the shared memory, and means for determining whether to decode the subsequent region of the frame of video data based on the information.

In another example, this disclosure describes a non-transitory computer-readable storage medium storing instructions that, when executed causes one or more processors configured to decode video data to track completion of decoding samples of one or more regions of a frame of video data. write information to a shared memory, the information indicative of the completion of decoding the samples of the one or more regions of the frame of video data. read, prior to decoding a subsequent region of the frame of video data, the information in the shared memory, and determine whether to decode the subsequent region of the frame of video data based on the information.

In another example, this disclosure describes an apparatus configured to encode video data, the apparatus comprising a shared memory, and one or more processors configured to execute a plurality of video encoding cores, each of the plurality of video encoding cores in communication with the shared memory. At least one of plurality of video encoding cores are configured to track completion of encoding and reconstructing samples of one or more regions of a frame of video data, write information to the shared memory, the information indicative of the completion of encoding and reconstructing the samples of the one or more regions of the frame of video data, read, prior to encoding a subsequent region of the frame of video data, the information in the shared memory, and determine whether to encode the subsequent region of the frame of video data based on the information.

The details of one or more examples are set forth in the accompanying drawings and the description below. Other features, objects, and advantages will be apparent from the description, drawings, and claims.

BRIEF DESCRIPTION OF DRAWINGS

FIG. 14 is a table illustrating example pointer statistics for various example techniques of the disclosure.

DETAILED DESCRIPTION

In general, this disclosure describes techniques for encoding and decoding video data. In particular, this disclosure describes techniques for tracking the completion of coding (e.g., encoding or decoding) samples and/or pixels of video data in a multicore video coding system.

In some example video coding systems, when performing a prediction process on samples of video data in a current frame, the video coding system may only need to read back samples from previously decoded frames. In this example, all the coded samples were readily available to the video coding system. However, in some video coding systems that implement a codec that supports intra block copy or other similar intra frame coding techniques, the video coding system may be configured to perform a prediction process on samples in a current frame that use other samples in the same frame. Such samples may not be readily available since it is not guaranteed that the portion of the frame needed for performing the prediction process on one sample has already been completed (e.g., already encoded and reconstructed or already decoded). This problem becomes more difficult when multiple regions of a frame are coded in parallel using a multicore video coding system.

To address this problem, this disclosure describes techniques and devices where a video coding core in a multicore video coding system is configured to track the completion of the coding of samples/pixels of video data. The video coding core may write information to a shared memory, where the information indicates the completion of the coding of samples/pixels in a frame of video data. The shared memory is accessible by each video coding cores of the multicore video coding system.

In this way, when performing an intra frame prediction process like intra block copy, a video coding core may access the information in the shared memory to determine if the samples/pixels needed for the prediction process have been completed and are available. If yes, the video coding core may continue with the prediction process. If the samples/pixels are not available, the video coding core may wait until information is written to the shared memory indicating the samples/pixels are completed and available.

Figure 1:
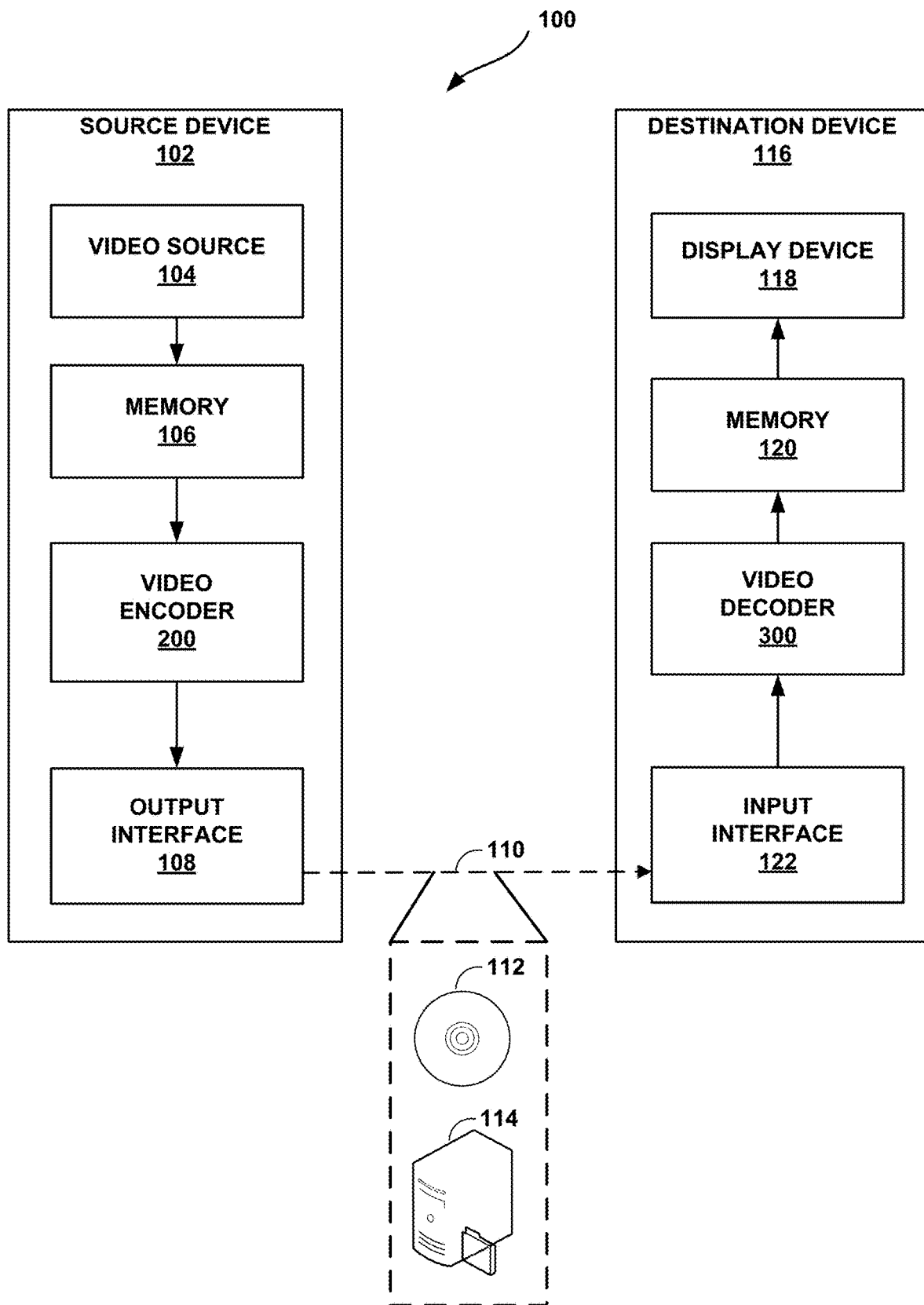
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure for tracking pixel completion in a multicore video encoding and/or video decoding system. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for encoding and decoding chroma samples of a chroma block of video data using chroma from luma prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for encoding and decoding using a multicore system that is configured to track pixel completion. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In examples of this disclosure, video encoder 200 and video decoder 300 may be configured as a plurality of video decoding cores or video encoding cores (e.g., in general a video coding core). Each of the plurality of video coding cores of video encoder 200 and video decoder 300 may be configured to operate on different regions of video data in parallel. For example, each processing core of video encoder 200 and/or video decoder 300 may be configured to operate on predefined rows of video data in parallel. These predefined rows may be rectangular regions of video data (e.g., samples or pixels), such as largest coding unit (LCU) rows, coding tree unit (CTU) rows, macroblock rows, super block rows, tile rows, brick rows, or any other type of predefined regions of video data in a video compression standard or video coding format.

As will be explained in more detail below, this disclosure describes example techniques and structures that include tracking the completion of pixel and/or sample coding and storing data indicative of the completion of the decoding or encoding (e.g., encoding and subsequent encoder-side reconstruction) to a shared memory that is accessible by all video coding cores or a multicore video encoder or video decoder. The video coding cores may be configured to access the data stored to a shared memory to determine if certain pixels or samples have finished being coded such that the coded data is available to a video coding core in order to perform an intra frame coding technique (e.g., intra block copy coding).

In the examples described below, video encoder 200 and video decoder 300 may be configured to track completion of encoding and decoding pixels in one or more regions, include blocks, tiles, tile rows, and vertical columns of block of video data. In some examples, such "regions" are contiguous (e.g., overlapping) with how a frame of video data is partitioned for applying coding techniques. In general, a video frame may be partitioned in one or more tree structures based on some predefined largest block size, like an LCU, CTU, macroblock, superblock, etc. In general, these "largest block sizes" may be referred to as a "codec tile." Each video coding core of a multicore video coding system may process a codec tile row of video data.

In other example of the disclosure, the regions on which completion of encoding and decoding are tracked are not contiguous with the partitioning of the frame. Rather, video encoder 200 and video decoder 300 may be configured to write out the values of coded samples/pixels in fixed block sizes to a memory (e.g., a shared memory). These fixed block sizes for writing data to memory are referred to as a memory tile or memory block. In some examples, video encoder 200 and video decoder 300 may be configured to apply a compression scheme on the fixed memory tiles when writing data (e.g., decoded and/or reconstructed sample/pixel values) to shared memory. One example compression scheme is Universal Bandwidth Compression (UBWC) developed by Qualcomm, Inc. of San Diego, CA.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that uses a multicore encoding system and/or is configured to perform intra-frame coding techniques, such as intra block copy.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configure to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction, non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

In non-directional smooth intra prediction, video encoder 200 may determine prediction samples according to a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in sub-blocks (e.g., 2×2 sub-blocks) of a luma block minus the average luma sample value of the block, as well as DC prediction samples for the chroma block, to determine a final prediction sample for predicting the chroma samples. The sums of reconstructed luma samples in sub-blocks (e.g., 2×2 sub-blocks) of a luma block minus the average luma sample value of the block represent an "AC" contribution from the luma block.

In intra block copy mode, video encoder 200 and video decoder 300 may predict a coding block using a previously-reconstructed and/or decoded coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen).

As explained above, implementation of intra block copy coding may be difficult in multicore video coding system where each video coding core is operating on a different row of codec tiles. For example, if a second video decoding core (e.g., Core1) is instructed to decode a block of video data using intra block copy mode, and the displacement vector points to a block being decoded by a first video decoding core (e.g., Core0), the second video decoding core may not be able to determine if the first video decoding core has completed decoding or not, such that the samples/pixels are available for use in the intra block copy process.

This disclosure addresses this problem by having the video decoding cores track completion of decoding samples of one or more regions of a frame of video data, and write information to the shared memory, the information indicative of the completion of decoding the samples of the one or more regions of the frame of video data. A video decoding core may then read, prior to decoding a subsequent region of the frame of video data, the information in the shared memory, and determine whether to decode the subsequent region of the frame of video data based on the information. For example, a portion of the subsequent region may be predicted, using intra-block copy, relative to the previous region. Thus, if a video decoding core determines that a portion of a region of a frame of video data is predicted, using intra-block copy, relative to a portion of the previous region, the video decoding core may determine whether the previous region has finished being decoded using the information in the shared memory.

In one example, the video decoding core may determine to decode the subsequent region of the frame of video data based on the information indicating that the samples of the one or more regions of the frame of video data needed for decoding the subsequent region are completed. In another example, the video decoding core may determine to not decode the subsequent region of the frame of video data based on the information indicating that the samples of the one or more regions of the frame of video data needed for decoding the subsequent region are not completed. The video decoding core may then wait a period of time, and determine, after the period of time, whether to decode the subsequent region of the frame of video data based on the information. While described with reference to intra block copy mode, the techniques of this disclosure may be applicable for any intra frame encoding technique where one video coding core is allowed to use decoded samples in the same frame that are decoded by another video core in the multicore system.

In each of the aforementioned intra prediction modes, video encoder 200 may generate a residual block by subtracting the sample values of a currently coded block from prediction pixels generated in accordance with one of the intra prediction modes. Color palette mode is considered another type of intra prediction mode, as color palette mode does not use predicted samples generated from reference samples values. However, video encoder 200 and video decoder 300 do not encode and decode, respectively, residual values in color palette mode. Instead, video encoder 200 may associate code information that indicates an index to a color palette for each sample/pixel of the coding block. The color palette is a table of color values. Color palette mode may be useful for frames of video data with an limited number of unique colors (e.g., screen content).

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode.

Like for intra prediction modes (excepting color palette mode), video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provide an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determines prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
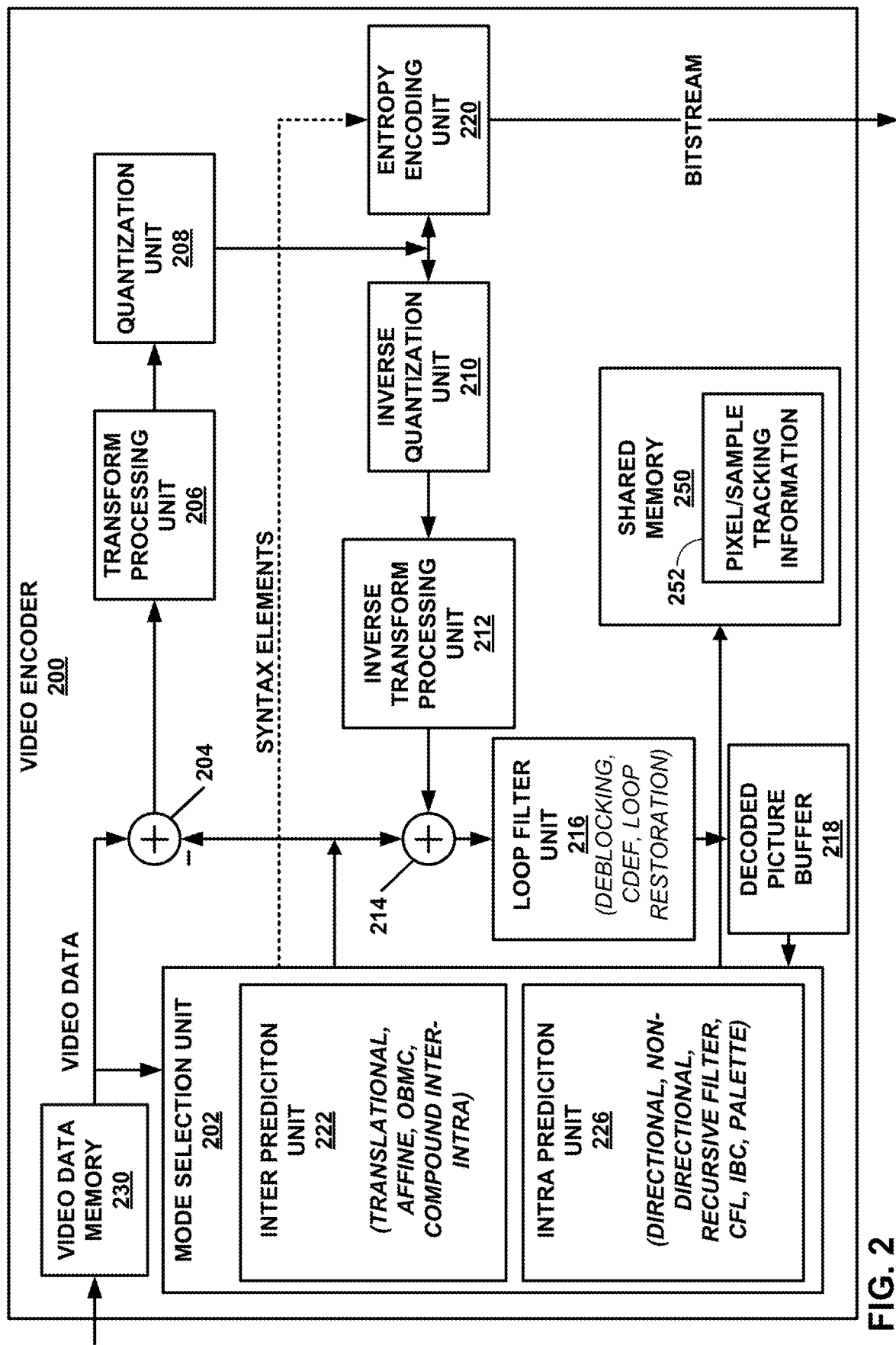
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of the AV1 coding format. However, the techniques of this disclosure may be performed by video encoding devices that are configured to encode video data according to other video coding formats and/or various video coding standards. In particular, the techniques of this disclosure may be applicable for use with any video coding formats or standards that include intra frame coding techniques where one video coding core is allowed to use decoded samples in the same frame that are decoded by another video core in a multicore system.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, entropy encoding unit 220, and shared memory 250. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, shared memory 250, and entropy encoding unit 220 may be implemented in one or more processors or in processing circuitry.

For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

In some examples, the structures of video encoder 200 shown in FIG. 2 may be a single video encoding core of a multicore video encoding system. That is, video encoder 200 may comprise multiple instances of the structures shown in FIG. 2, where each video encoding core the multicore system may be configured to encode codec tiles of video data in parallel with one another. As explained above, video frame may be partitioned in one or more tree structures based on some predefined largest block size, like an LCU, CTU, macroblock, superblock, etc. In general, these "largest block sizes" may be referred to as a "codec tile." Each video coding core of a multicore video encoding system may process a codec tile row of video data. Vide data memory 230, DPB 218, and shared memory 250 may be accessible by each video encoding core of the multicore video encoding system. That is, rather than each individual video encoding core having a dedicated video data memory, DPB, or shared memory, there may be a single video data memory 230, DPB 218, and shared memory 250 that are accessible by each video encoding core.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

Shared memory 250 may also be implemented as any of a variety of memory devices, such as DRAM, including SDRAM, MRAM, RRAM, or other types of memory devices. In some examples, shared memory 250 may be part of the same memory unit or units as DPB 218. As will be explained in further detail below, shared memory 250 may store pixel/sample tracking information 252 which indicates the completion of encoding and reconstructing the samples of the one or more regions of the frame of video data. A video encoding core of video encoder 200 may read the pixel/sample tracking information 252 to determine if a currently coded block of video data (e.g., coded using intra block copy mode) may begin or if the video encoding core should wait until an indication that the needed samples/pixels have been completed.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to encode coding blocks of video data (e.g., both luma and chroma coding blocks) using translational motion compensation, affine motion compensation, OBMC, and/or compound inter-intra prediction, as described above. Intra prediction unit 226 may be configured to encode coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may not generate prediction samples, and instead generates syntax elements that indicate the manner in which to reconstruct the block based on a selected color palette. In such modes, mode selection unit 202 may provide these syntax elements to entropy encoding unit 220 to be encoded.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 220 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

In accordance with the techniques of this disclosure, as will be explained in more detail below, video encoder 200 may be configured to track completion of encoding and reconstructing samples of one or more regions of a frame of video data, write information to the shared memory, the information indicative of the completion of encoding and reconstructing the samples of the one or more regions of the frame of video data, read, prior to encoding a subsequent region of the frame of video data, the information in the shared memory, and determine whether to encode the subsequent region of the frame of video data based on the information.

Figure 3:
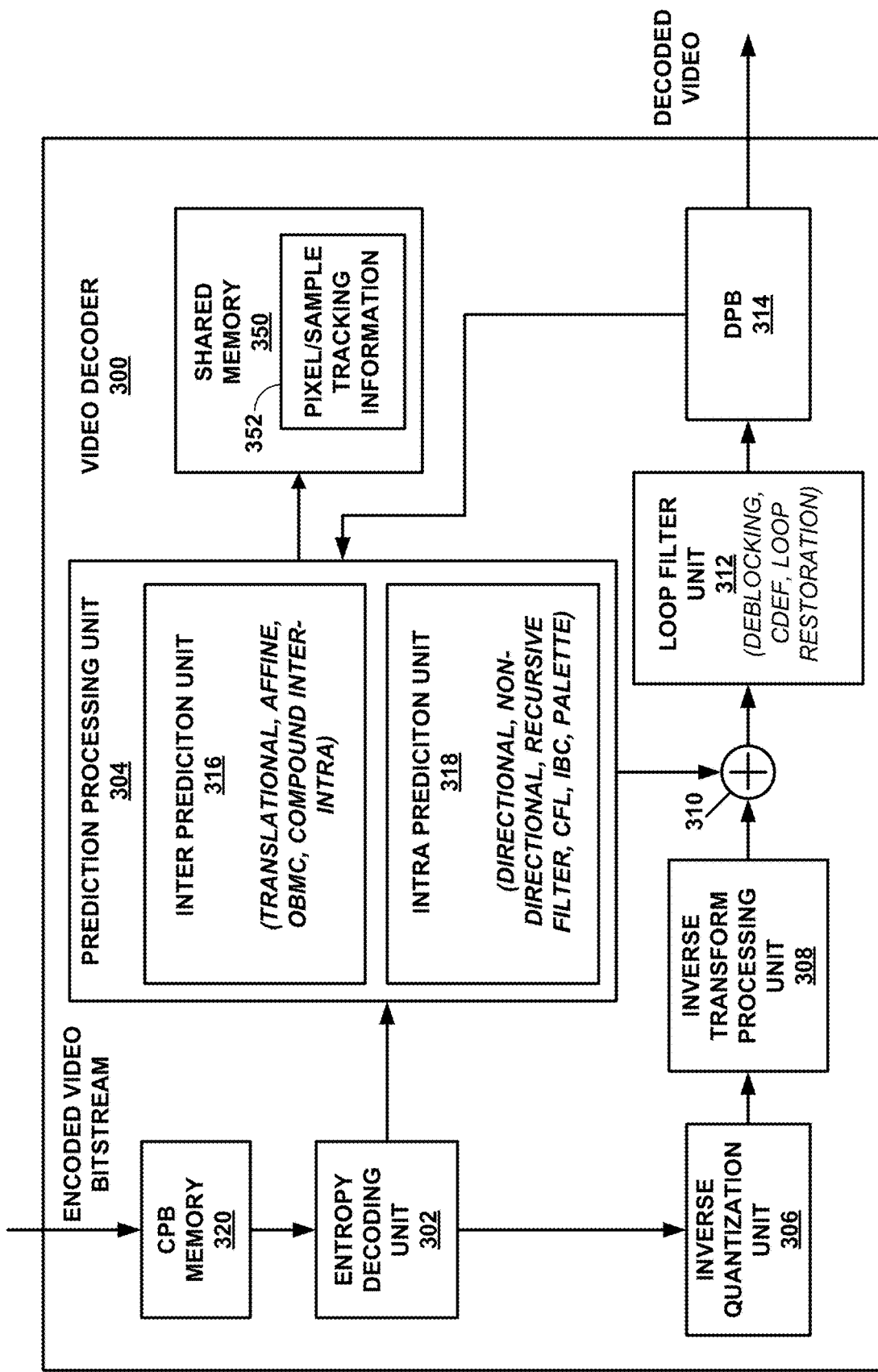
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of the AV1 video coding format. However, the techniques of this disclosure may be performed by video decoding devices that are configured to decode video data according to other video coding formats and/or various other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, decoded picture buffer (DPB) 314, and shared memory 350. Any or all of CPB memory 320, entropy decoding unit 302, prediction processing unit 304, inverse quantization unit 306, inverse transform processing unit 308, reconstruction unit 310, loop filter unit 312, shared memory 350, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

In some examples, the structures of video decoder 300 shown in FIG. 3 may be a single video decoding core of a multicore video decoding system. That is, video decoder 300 may comprise multiple instances of the structures shown in FIG. 3, where each video decoding core the multicore system may be configured to decode codec tiles of video data in parallel with one another. As explained above, video frame may be partitioned in one or more tree structures based on some predefined largest block size, like an LCU, CTU, macroblock, superblock, etc. In general, these "largest block sizes" may be referred to as a "codec tile." Each video decoding core of a multicore video decoding system may process a codec tile row of video data. CPB memory 320, DPB 314, and shared memory 350 may be accessible by each video decoding core of the multicore video encoding system. That is, rather than each individual video encoding core having a dedicated video data memory, DPB, or shared memory, there may be a single video data memory 230, DPB 218, and shared memory 250 that are accessible by each video decoding core.

Prediction processing unit 304 includes inter prediction unit 316 and intra prediction unit 318. Inter prediction unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

Shared memory 350 may also be implemented as any of a variety of memory devices, such as DRAM, including SDRAM, MRAM, RRAM, or other types of memory devices. In some examples, shared memory 350 may be part of the same memory unit or units as DPB 314. As will be explained in further detail below, shared memory 350 may store pixel/sample tracking information 352 which indicates the completion of decoding the samples of the one or more regions of the frame of video data. A video decoding core of video decoder 300 may read the pixel/sample tracking information 352 to determine if a currently decoded block of video data (e.g., decoded using intra block copy mode) may begin or if the video decoding core should wait until an indication that the needed samples/pixels have been completed.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 222 (FIG. 2).

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 2). Intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1. As will be described in more detail below, video decoder 300 may be configured to track completion of decoding samples of one or more regions of a frame of video data, write information to a shared memory, the information indicative of the completion of decoding the samples of the one or more regions of the frame of video data, read, prior to decoding a subsequent region of the frame of video data, the information in the shared memory, and determine whether to decode the subsequent region of the frame of video data based on the information.

The techniques described below with reference to FIGS. 4-16 will be described in terms of video decoding. However, it should be understood that the techniques of this disclosure may also be applied in a video encoder. That is, in a video decoding scenario, video decoding cores of a multicore video decoder may be configured to track the completion of the decoding of samples and/or pixels. Likewise, in a video encoding scenario, video encoding cores of a multicore video encoder may be configured to track the completion of the encoding and subsequent reconstruction (e.g., for storage in DPB 218 of FIG. 2) of samples and/or pixels.

Furthermore, the techniques described below will be described with reference to tracking the completion of samples. In this context, a sample may refer to a single color component of a pixel value. For example, for a pixel value in YCrCb format, there are three samples: Y (luma), Cr (red chroma), and Cb (blue chroma). However, the techniques of this disclosure are equally applicable to tracking the completion of complete pixel values. For example, video encoder 200 and video decoder 300 may be configured to track when each sample value of entire pixel has completed being encoded and reconstructed or decoded.

Figure 4:
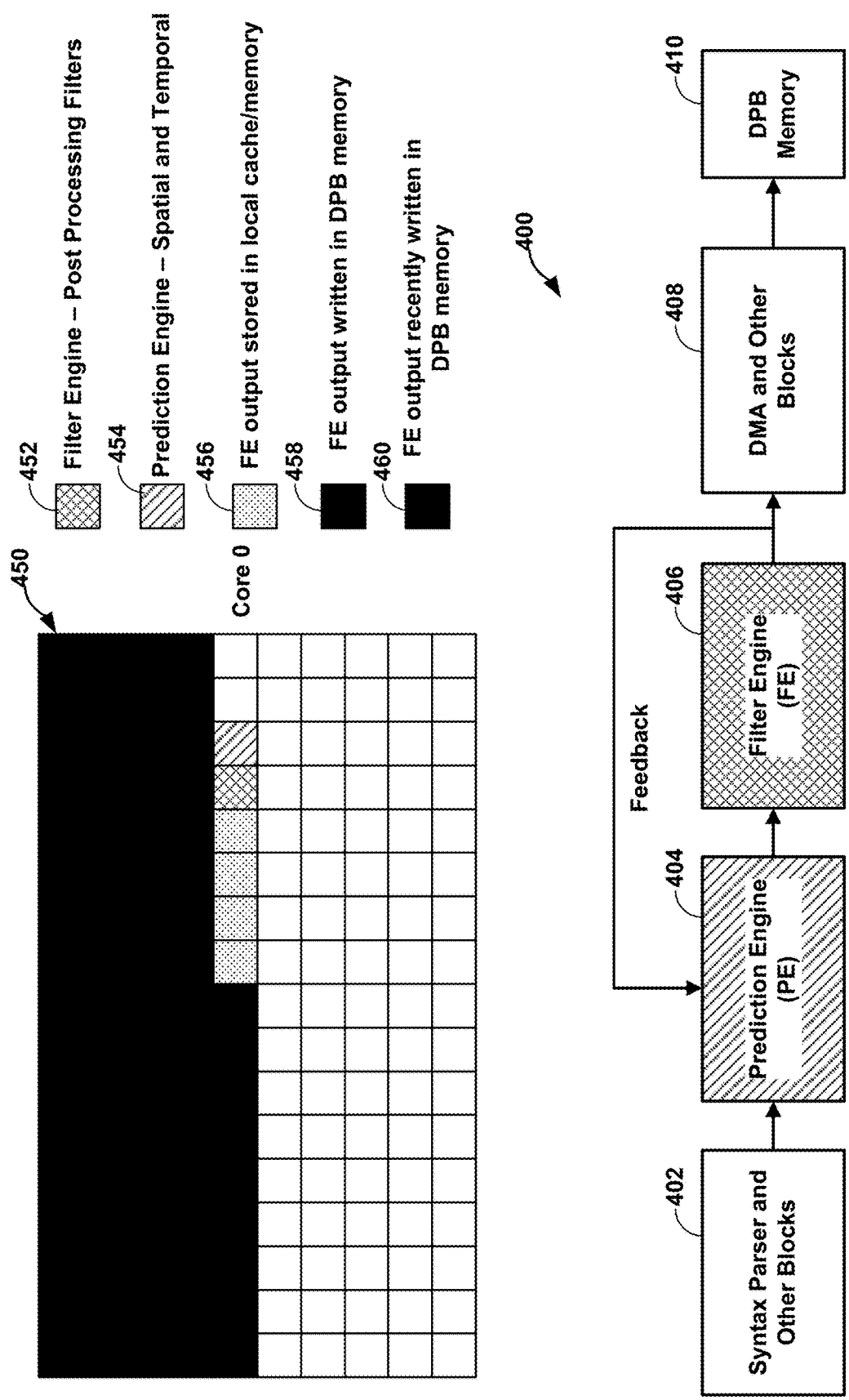
FIG. 4 is a conceptual diagram illustrating a coding process for single processing core.

FIG. 4 is a conceptual diagram illustrating a coding process for single processing core. FIG. 4 shows a single video decoding core 400. Video decoding core 400 may be configured to perform the video decoding techniques described above for video decoder 300 (FIG. 3). Video decoding core 400 may include a syntax parser and other blocks 402 configured to parse syntax elements and route video data received from a video encoder (e.g., video encoder 200). Prediction engine (PE) 404 may be configured to perform one or more spatial or temporal prediction processes, including intra block copy and other intra frame prediction processes, on a block of vide data. With reference to FIG. 3, PE 404 may be configured to perform the techniques of prediction processing unit 304. Filter engine (FE) 406 may be configured to perform filtering operations (e.g., post processing filter operations) on sample values decoded by PE 404. With reference to FIG. 3, FE 406 may be configured to perform the techniques of loop filter unit 312. Direction memory access (DMA) and other blocks 408 may be configured to store decoded and filtered sample values in DPB memory 410. With reference to FIG. 3, DPB memory 410 may be equivalent to DPB 314.

As shown in the top portion of FIG. 4, video decoding core 400 may be configured to decode blocks of frame 450. Blocks 458 represent blocks of sample values that FE 406 has written to DPB memory 410. Block 460 represents a block of sample values that FE 406 has most recently written to DPB memory 410. Blocks 456 represent blocks of sample values that FE 406 has stored to a local cache/memory. In this context, the local cache/memory is a cache and/or memory that is only accessible to FE 406 and is not accessible to PE 404. Block 452 represents a block of sample values that FE 406 is currently processing. Block 454 represents a block of sample values that PE 404 is currently processing. All other blocks in frame 450 have yet to be decoded.

In the example of FIG. 4 and the examples described below, it assumed that blocks of video data are processed in a left-to-right raster scan order. However, the techniques of this disclosure are applicable with any order of processing and decoding video data.

The "blocks" described in the paragraph above refer to 2D blocks of sample values of a fixed size that are written to DPB memory 410. Such blocks may be referred to as "memory blocks" and/or "memory tiles" and do not necessarily, and often do not, overlap with any partitioned blocks of the video codec implemented by video decoding core 400.

In some example codecs, PE 404 may be configured to only read back decoded reference samples (labeled as "feedback") processed by FE 406 from previously processed frames. As such, all the processed and decoded sample values were readily available to PE 404. However, in some codecs where intra block copy mode is allowed, such as AV1, PE 404 may be configured to read back decoded reference samples processed by FE 406 from the same frame currently being decoded. As such, the sample values needed by PE 404 may not be readily available since the sample values needed may not have been decoded already. This situation may arise more frequently in multicore video decoders where multiple video decoding cores are operating on rows of codec tiles in parallel. In general, a video frame may be partitioned in one or more tree structures based on some predefined largest block size, like an LCU, CTU, macroblock, superblock, etc. In general, these "largest block sizes" may be referred to as a "codec tile." Each video decoding core of a multicore video decoding system may process a codec tile row of video data in parallel.

Figure 5:
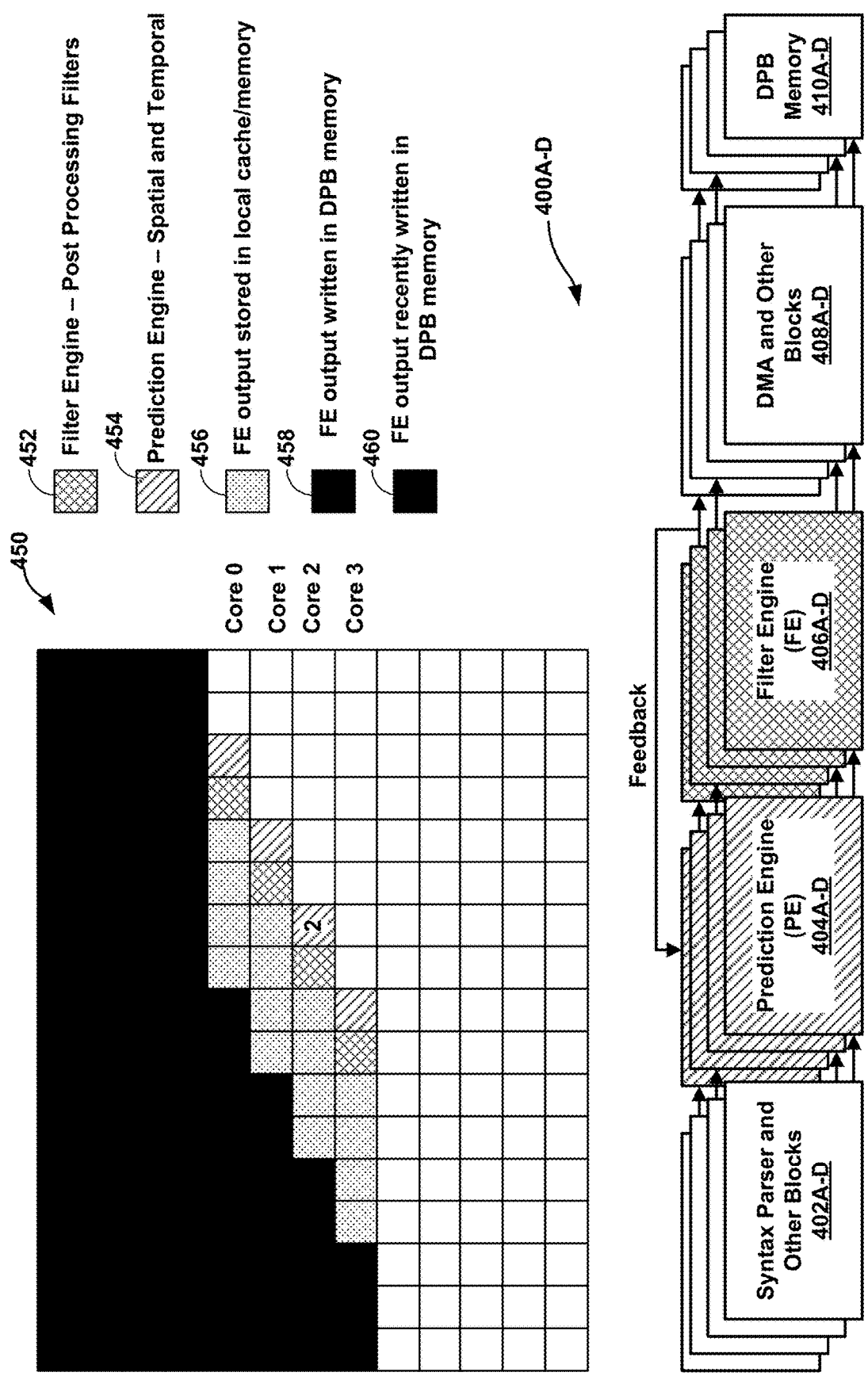
FIG. 5 is a conceptual diagram illustrating a coding process for a plurality of processing cores.

FIG. 5 is a conceptual diagram illustrating a coding process for a plurality of processing cores. FIG. 5 shows a multicore video decoding system that includes video decoding cores 400A (Core 0), video decoding core 400B (Core 1), video decoding core 400C (Core 2), and video decoding core 400D (Core 3) (labeled 400A-D). Essentially, video decoding cores 400A-D includes four instances of video decoding core 400 of FIG. 4, each having a DPB memory 410A-D accessible to all other video decoding cores. The examples of this disclosure show four video decoding cores. The techniques of this disclosure are not limited to that configuration, but may be used with any multicore video coding system that has at least two video coding cores.

FIG. 5 shows the DPB memory 410A-D as four different memories, but in other examples, DPB memory 410A-D is a single memory unit accessible by each of video decoding cores 400A-D. Each of video decoding cores 400A-D include a respective syntax parser and other blocks 402A-D, PE 404A-D, FE 406A-D, and DMA and other blocks 408A-D.

As shown in FIG. 5, each of Core 0, Core 1, Core 2, and Core 3 of video decoding cores 400A-D are configured to process a separate memory and/or codec tile row of frame 450. When performing an intra-frame prediction process on block 454 with the label "2", such as intra block copy, PE 404C of video decoding core 400C (Core 2) may need to access the samples in block 458 with the label "1." Hence, the processed samples from FE 406A of video decoding core 400A (Core 0) for block 458 with the label "1" need to be written to a shared memory (e.g., DPB 410A-D) before being read back and used by PE 404C of video decoding core 400C (Core 2).

To facilitate the timing of the reading of previously-decoded samples by another video decoding core, video decoding cores 400A-D may be configured to track the completion of video decoding and storage in a shared memory (e.g., DPB memory 410A-D) in a manner that is accessible to each of the video decoding cores. In one example, one or more of video decoding cores 400A-D may be configured to track completion of decoding samples of one or more regions of a frame of video data. The one or more regions include at least one of a memory block row to a frame edge of the frame of video data, a current memory tile of the frame of video data, a previous memory tile of the frame of video data, a 2D memory block of video data, and/or a vertical column of 2D memory blocks of the current memory tile of video data. How completion of different regions of a frame of video data may be tracked will be described in more detail below.

In the context of this disclosure, completion of decoding samples may be defined as the storage of decoded samples in a memory that is accessible to each of video decoding cores 400A-D (e.g., DPB memory 410A-D). In the example of FIG. 5, such storage to DPB memory 410A-D occurs after filters are applied by FE 406A-D. However, in other examples, decoded samples may be stored to a shared memory without application of filters.

Video decoding cores 400A-D may be further configured to write information to a shared memory, the information indicative of the completion of decoding the samples of the one or more regions of the frame of video data. Referring to FIG. 3, the information may be pixel/sample tracking information 352 and the shared memory may be shared memory 350. Different examples of the types of information that may be written to shared memory 350, and how that information relates to the one or more regions being tracked for the completion of decoding video samples, will be described in more detail below.

Video decoding cores 400A-D may be further configured to read, prior to decoding a subsequent region of the frame of video data, the information in the shared memory. In particular, video decoding cores 400A-400D may be configured to read the information indicative of the completion of decoding samples in the case that a current block of video data (i.e., the subsequent region) is to be coded using an intra frame prediction process or other video decoding tool that uses decoded samples processed by another video decoding core in the same frame of video data as the currently decoded block. As described above, one example intra frame prediction process is intra block copy. The techniques of this disclosure may also be applicable for any intra prediction technique, where the intra prediction technique is allowed to use samples of decoded video data across boundaries being decoded by other video decoding cores.

Video decoding cores 400A-D may then, after reading the information, determine whether to decode the subsequent region of the frame of video data based on the information. For example, video decoding cores 400A-D may determine to decode the subsequent region of the frame of video data based on the information indicating that the samples of the one or more regions of the frame of video data needed for decoding the subsequent region are completed. Conversely, video decoding cores 400A-D determine to not decode the subsequent region of the frame of video data based on the information indicating that the samples of the one or more regions of the frame of video data needed for decoding the subsequent region are not completed. Instead, video decoding cores 400A-D may wait until the information indicates that the decoded samples are completed. For example, video decoding cores 400A-D may wait a period of time (e.g., a number of clock cycles), and then redetermine, after the period of time, whether to decode the subsequent region of the frame of video data based on the information.

FIGS. 6-13 below illustrate different techniques for tracking different regions and/or sets of regions using different types of information written to shared memory accessible by each of video decoding cores 400A-B. The information written to shared memory (e.g., shared memory 350) that is indicative of the completion of decoding samples may include one or more flags and/or pointers that are either specific to a particular video decoding core, or are shared by all of the video decoding cores. Even if a flag or pointer is specific to a particular video decoding core, such a flag or pointer is accessible and readable by each of the video decoding cores in the multicore video decoding system.

As described above, video decoding cores 400A-D are configured to write the flags and/or pointers to shared memory 350 after decoded samples are confirmed to be written to a memory accessible to each of the video decoding cores (e.g., DPB 314). As mentioned above with reference to FIG. 3, the shared memory 350 may be part of DPB 314. As such, with reference to FIG. 5, video decoding cores 400A-D may be configured to write the flags and/or pointers indicative of the completion of decoding samples to DPB memory 410A-D.

Figure 6:
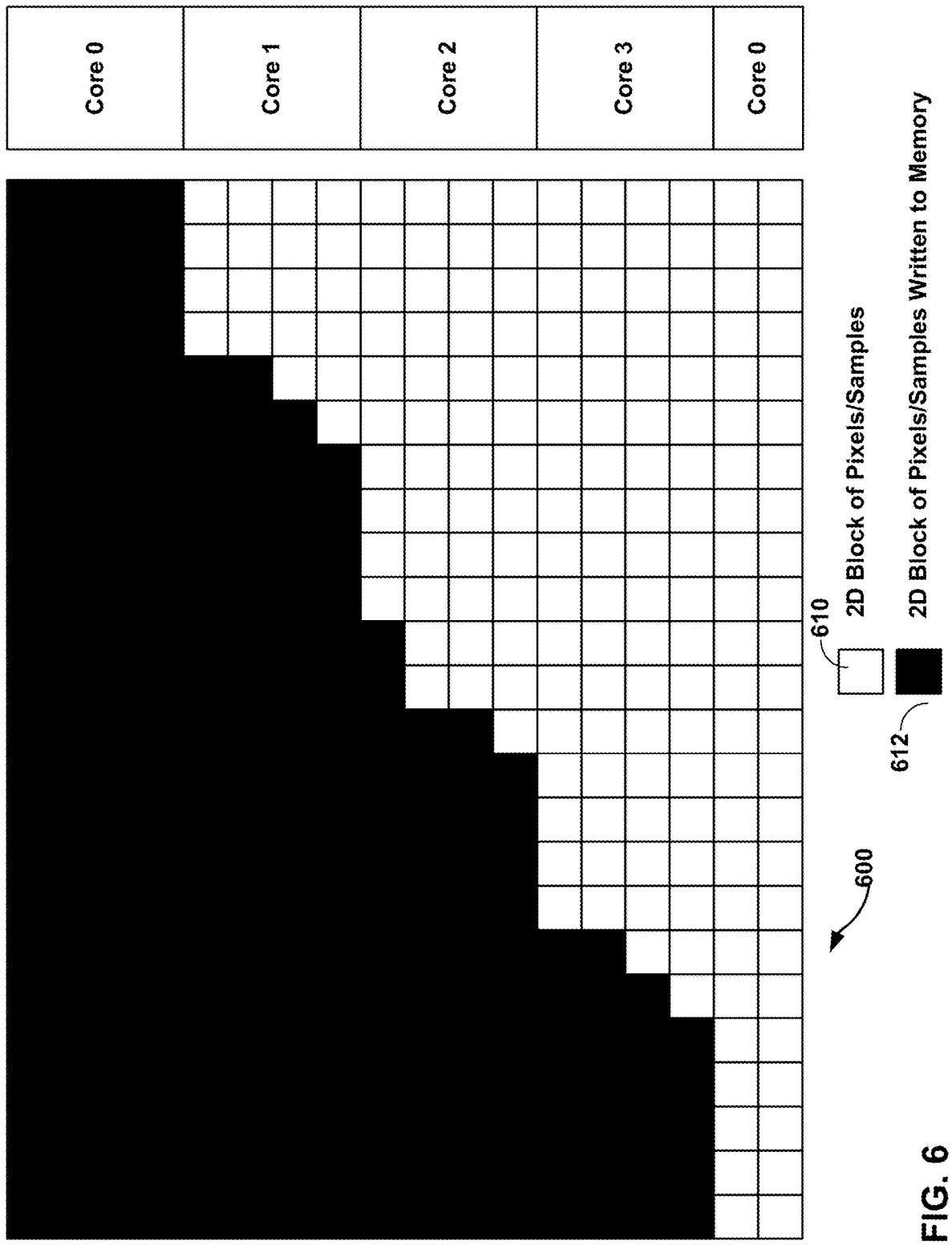
FIG. 6 is a conceptual diagram illustrating a first example of pixel/sample tracking according to the techniques of this disclosure.

FIG. 6 is a conceptual diagram illustrating a first example of pixel/sample tracking according to the techniques of this disclosure. As shown in FIG. 6, each of Core 0-Core 3 are configured to decode four rows of memory blocks in frame 600. Taken together, a rectangular grouping of four rows of memory blocks may form a memory tile. Each of the memory blocks 610 and 612 shown in FIG. 6 represent a fixed size of the smallest unit of sample data that is written to DPB memory 410A-D. The memory blocks 610 are 2D blocks of samples that are to be written to DPB memory 410A-D. Memory blocks 612 are 2D blocks of samples that have already been written to DPB memory 410A-D by one of Cores 0-3. The memory blocks in frame 600 may not be contiguous with partitions of video data in the frame. That is the memory blocks 610 or 612 may include exactly one block of partitioned video data, less than one block of partitioned video data, or more than one block of partitioned video data, depending on how a particular frame of video data is partitioned.

Video decoding cores 400A-D (e.g., Cores 0-3) are configured to track the completion of decoding samples in each memory block and write a 1-bit flag or pointer to a shared memory accessible to each video decoding core once decoding of samples in a memory block is completed and written to DPB memory 410A-D. The "1" in each of memory blocks 612 of FIG. 6 represents this 1-bit flag. When a particular video decoding core needs to access sample values outside the rows the video decoding core is processing, the video decoding core may access the 1-bit flag in shared memory associated with the samples needed and determine if the samples are available to read out of DPB memory 410A-D based on the value of the flag. For example, a "1" value for the flag indicates that the decoding of such samples is completed, while a "0" value for the flag indicates that the decoding of such samples is not completed.

In some examples, when pointers are used to indicate whether a corresponding region/block of a frame has been decoded, a shared memory may include an array of pointers similar to the array of flags described above. The array of pointers may have a series of entries each representing a respective pointer. When a value of one pointer of the array of pointers has a null value (e.g., a value of zero), a video decoding core may determine that a corresponding block or region of video data has not yet finished being decoded, and therefore wait to access that block or region. On the other hand, when the corresponding block or region of video data has finished being decoded, a corresponding decoding core may set the value of the corresponding pointer in the array to a memory address of the corresponding block or region.

In some examples, when pointers are used, a single pointer may be maintained by each core to indicate a last decoded region or block. Thus, a different core may determine a position of a reference block according to intra-block copy, and then determine whether the position of the reference block is less than a position pointed to by the pointer. If the position of the reference block is less than the position pointed to by the pointer, the core may determine that the reference block has completed being decoded and is therefore accessible as a reference block for intra-block copy. On the other hand, if the position of the reference block is greater than the position pointed to by the pointer, the core may determine that the reference block has not been completely decoded and may, therefore, wait until the reference block has been completely decoded before access the reference block for intra-block copy (or other video decoding or processing procedures).

Accordingly, in the example of FIG. 6, a video decoding core may be configured to track completion of decoding samples in each block of the frame of video data, and may write data to a respective pointer (e.g., a 1-bit flag) that indicates completion of the respective block of the frame of video data. In this context, the "block" of the frame of video data, is a memory block of video data. That is, a 2D block of samples that is the smallest unit of data stored to DPB memory 410A-D. The techniques of FIG. 6 allow for the lowest amount of latency in terms of the amount of time a video decoding core may need to wait to determine if another video decoding core has completed the decoding samples. This is because the techniques of FIG. 6 track the completion of the decoding samples at a very low level of granularity. As will be seen with respect to other examples of the disclosure, the techniques of FIG. 6 may achieve this lower latency via the use of more bits for the information written to shared memory compared to other techniques.

Figure 7:
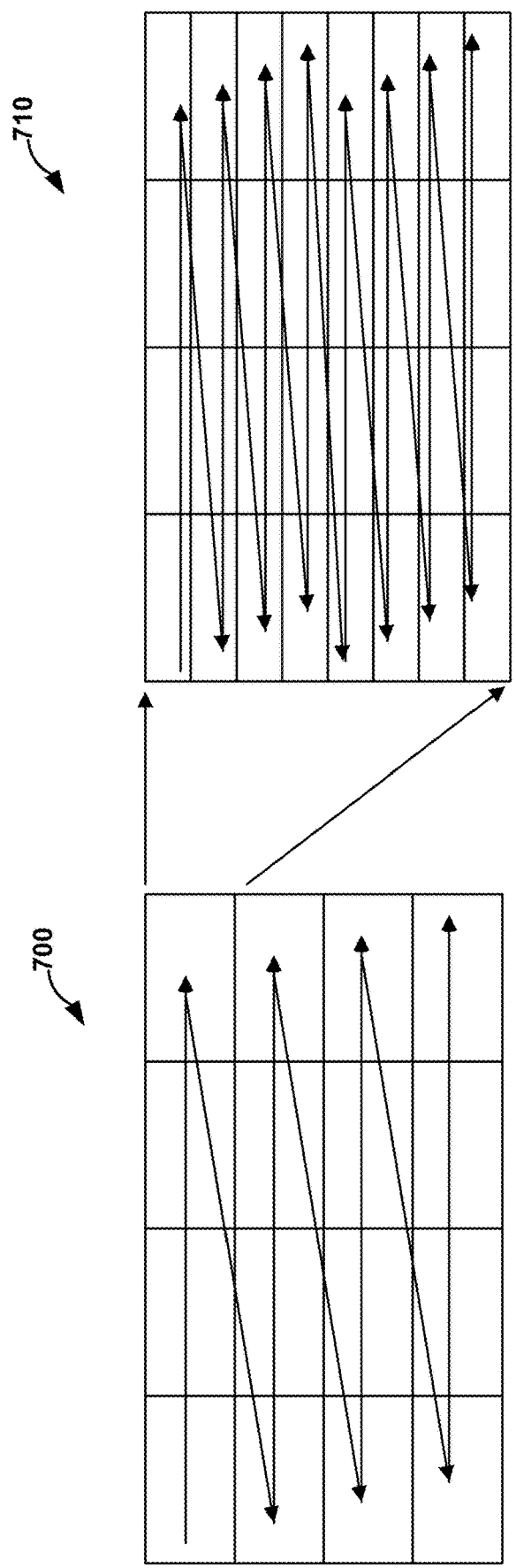
FIG. 7 is conceptual diagram illustrating of raster scans in a tile and 2D blocks of samples.

FIG. 7 is conceptual diagram illustrating of raster scans in a tile and 2D blocks of samples. In particular, FIG. 7 shows that raster scan order is used between tiles 700, as well as between blocks 710 within one particular tile of tiles 700. Many video coding formats, such as AV1, use this raster scan order. This means that once a video decoding core has started decoding a particular tile, it is known that the tile to the left of the current tile as already been decoded. Likewise, when a video decoding core has started decoding a particular block within a tile, it is known that the blocks to the left of the current block within the same tile have already been decoded. This raster scan order feature of many video codecs is leveraged to define on sample decoding is tracked in the following examples.

Figure 8:
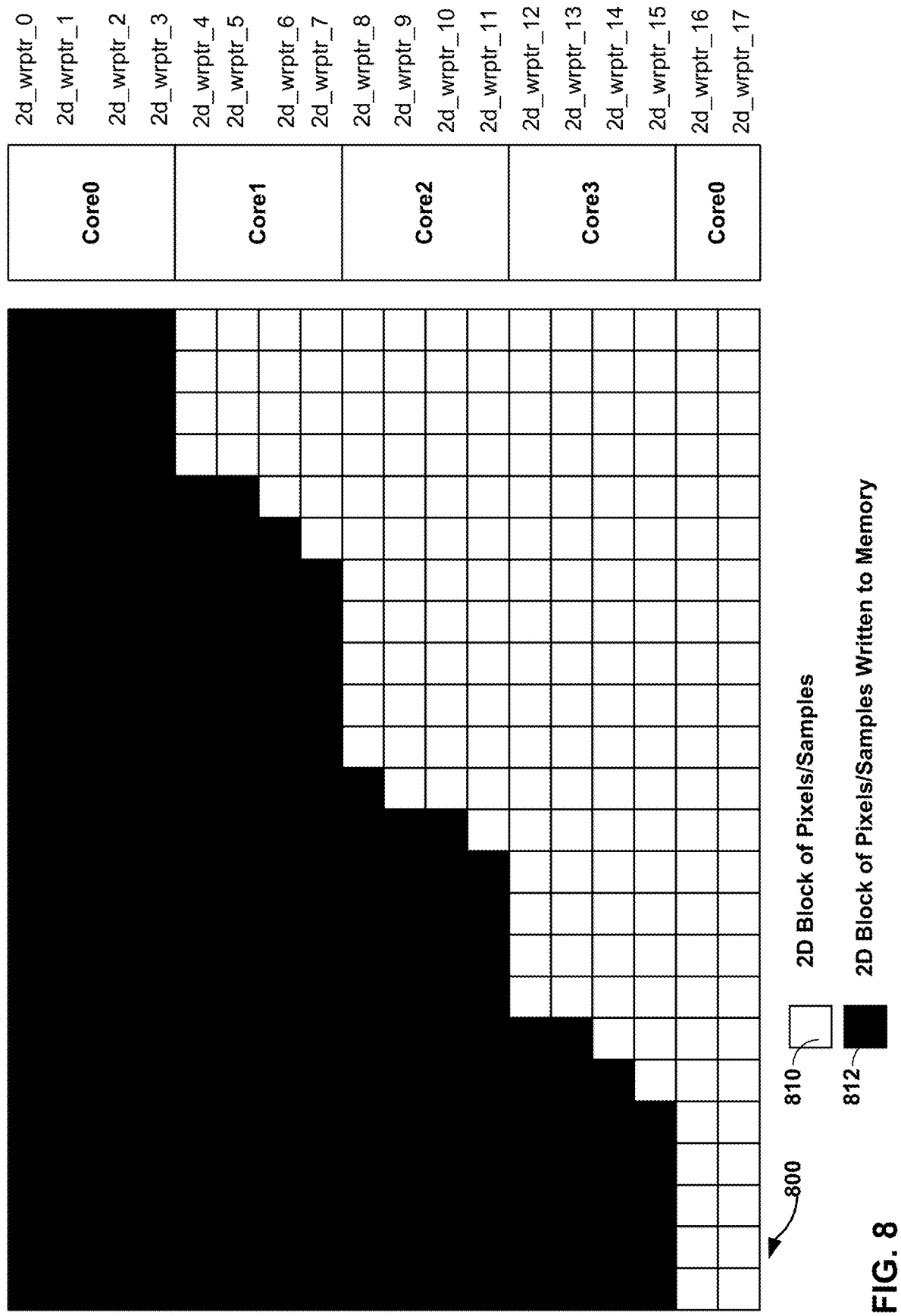
FIG. 8 is a conceptual diagram illustrating a second example of pixel/sample tracking according to the techniques of this disclosure.

FIG. 8 is a conceptual diagram illustrating a second example of pixel/sample tracking according to the techniques of this disclosure. As shown in FIG. 8, each of Core 0-Core 3 (e.g., video decoding cores 400A-D) are configured to decode four rows of memory blocks in frame 800. Taken together, a rectangular grouping of four rows of memory blocks may form a memory tile. Each of the memory blocks 810 and 812 shown in FIG. 8 represent a fixed size of the smallest unit of sample data that is written to DPB memory 410A-D. The memory blocks 810 are 2D blocks of samples that are to be written to DPB memory 410A-D. Memory blocks 812 are 2D blocks of samples that have already been written to DPB memory 410A-D by one of Cores 0-3. The memory blocks in frame 800 may not be contiguous with partitions of video data in the frame. That is the memory blocks 810 or 812 may include exactly one block of partitioned video data, less than one block of partitioned video data, or more than one block of partitioned video data, depending on how a particular frame of video data is partitioned.

As shown in FIG. 8, each of the video decoding cores is configured to track completion of decoding samples in a memory block row and maintains a respective pointer for each memory block row being processed. For example, Core 0 (video decoding core 400A) may maintain and update a first pointer for memory block row 0 (2d_wrptr_0), a second pointer for memory block row 1 (2d_wrptr_1), a third pointer for memory block row 2 (2d_wrptr_2), and a fourth pointer for memory block row 3 (2d_wrptr_3). The aforementioned pointers may generally be referred to as core row pointer. The term memory block row is used to signify that blocks 810 and 812 in FIG. 8 are 2D blocks of sample data of a predefined size to be stored to a shared memory (e.g., DPB memory 410A-D). Other places in the disclosure may refer to a "block row." The term block row is meant to be a more generic term that may apply to 2D memory blocks or blocks partitioned by a video codec (e.g., codec blocks).

For each memory block row (or more generally a block row), a video decoding core may update a respective pointer in the row to indicate the completion of the decoding of samples. In one example, a video decoding core may write a value to a pointer (e.g., 2d_wrptr_0) that indicates a number of memory blocks for which decoding has been completed. As the memory blocks are of a fixed size, the number of memory blocks completed would indicate which pixels/samples of video data have already been completed. In other examples, a video decoding core may write other information to the respective pointers that indicate how much of a memory block row has been completed. For example, the value written to the pointer may indicate an x and y position in the block, in terms of samples or pixels, that has been completed.

In the above example of the disclosure, video coding cores 400A-D may be configured to track completion of decoding samples in a number of blocks in a block row of the frame of video data. Video coding cores 400A-D may then write data to a respective core row pointer (e.g., 2d_wrptr_0, 2d_wrptor_1, etc.) that indicates completion of the number of blocks in the block row of the frame of video data. Like the example of FIG. 6, the example of FIG. 8 may achieve sample completion tracking with low latency, as the smallest unit of samples written to memory is tracked. In some examples, the techniques of FIG. 8 may require less shared memory to store then pointers, as the tracking area of frame 800 is proportional the frame height.

Figure 9:
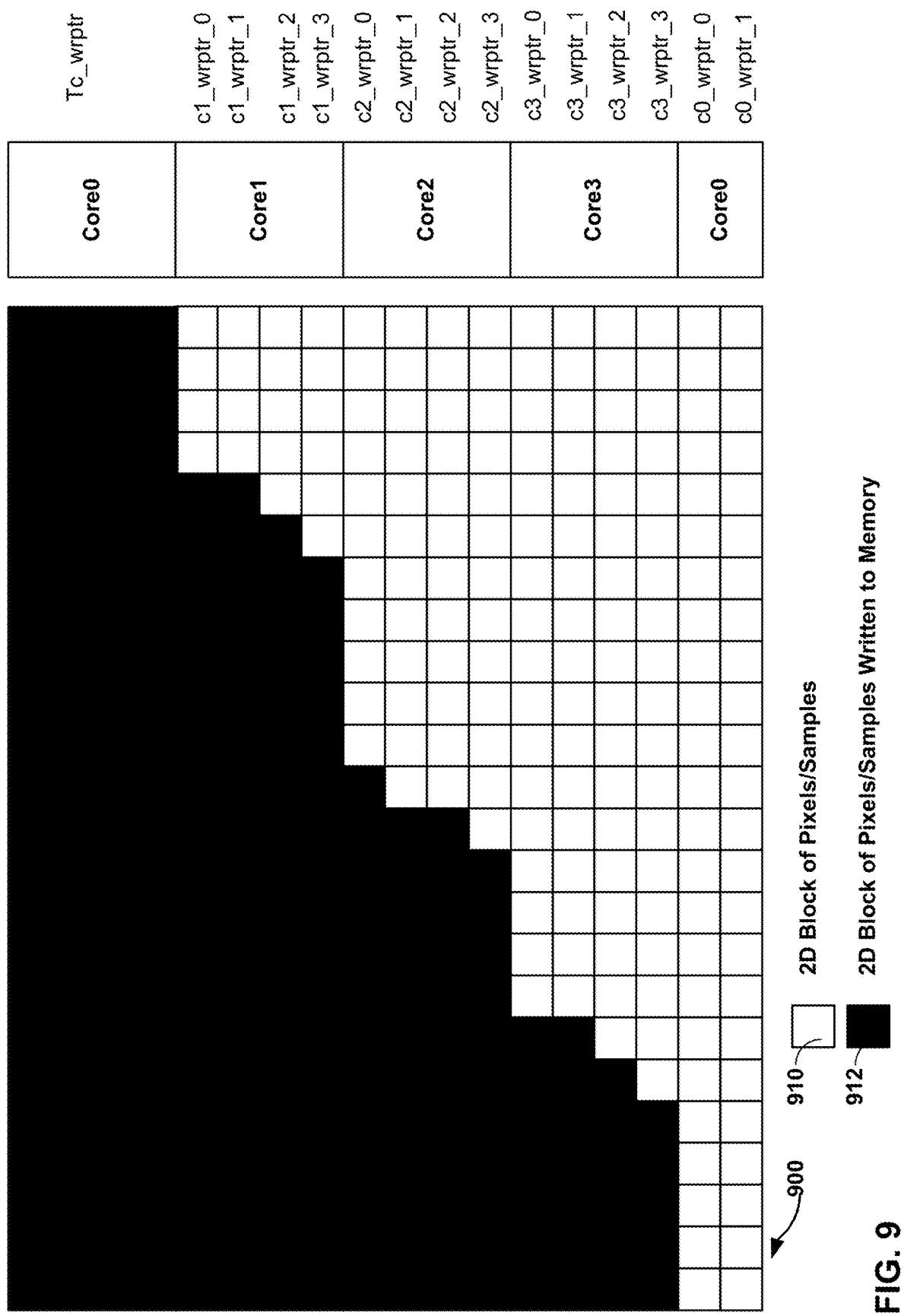
FIG. 9 is a conceptual diagram illustrating a third example of pixel/sample tracking according to the techniques of this disclosure.

FIG. 9 is a conceptual diagram illustrating a third example of pixel/sample tracking according to the techniques of this disclosure. As shown in FIG. 9, each of Core 0-Core 3 (e.g., video decoding cores 400A-D) are configured to decode four rows of memory blocks in frame 900. Again, taken together, a rectangular grouping of four rows of memory blocks may form a memory tile. Each of the memory blocks 910 and 912 shown in FIG. 9 represent a fixed size of the smallest unit of sample data that is written to DPB memory 410A-D. The memory blocks 910 are 2D blocks of samples that are to be written to DPB memory 910A-D. Memory blocks 912 are 2D blocks of samples that have already been written to DPB memory 410A-D by one of Cores 0-3. The memory blocks in frame 900 may not be contiguous with partitions of video data in the frame. That is the memory blocks 910 or 912 may include exactly one block of partitioned video data, less than one block of partitioned video data, or more than one block of partitioned video data, depending on how a particular frame of video data is partitioned.

The techniques of FIG. 9 use the core row pointers described above with reference to FIG. 8. The techniques of FIG. 9 introduce additional shared pointers that are used to indicate the completion of decoding of samples in a tile row, a current tile edge, and a previous tile. In this context, a tile may be a codec tile and may comprises a predefined number of LCUs, CTUs, macroblocks, superblocks, or other coded block partitions. In some examples, the video decoding cores may be configured to decode video data within a particular tile before decoding a next tile in raster scan order.

The shared pointers indicate completion of the block row to a frame edge, current tile edge, and previous tile may be shared by each of the video decoding cores. Tracking the completion of tiles in the manner is possible because decoding happens in a raster scan order (e.g., from left to right and top to bottom of frame 900).

For each video decoding core decoding a block row, which may be a CTU/LCU/Superblocks/Macroblock block row, the video decoding cores Cores 0-3 may maintain n row pointers per core, which are reused throughout the frame. In the example of FIG. 9, Cores 0-3 maintain four core row pointers (e.g., c1_wrptr_0, c1_wrptr_1, c1_wrptro_2, c1_wrptr_3) because the size of the CTU/LCU/Superblocks/Macroblock being decoding is four times the height of the memory block. More or fewer core row pointers may be maintained based on the size of CTU/LCU/Superblocks/Macroblock being decoded and the size of the memory block. In general, when decoding CTUs, the number of core row pointers n may be calculated as n=CTU_size/memory_block_size, where CTU_size is the width or height of a CTU in samples, and memory_block_size is the width or height of a memory block in samples.

Cores 0-3 may maintain and update three additional shared pointers for tracking progress of a block row to the frame edge of frame 900 (e.g., an F of F_wrtpr pointer), for tracking progress of a previous tile (e.g., a Tp or Tp_wrptr pointer), and for tracking progress of a current tile edge (e.g., a Tc or Tc_wrptr pointer). In this context, tracking completion of a current tile edge may comprise tracking completion of a block row to the current tile edge.

The techniques of FIG. 9 maintain the low latency of the techniques described above, with even lower implementation costs for the shared memory storing the pointers, as the shared pointers track the completion of decoding samples over larger areas. Thus, the total number of bits needed is reduced to track completion is reduced.

Figure 10:
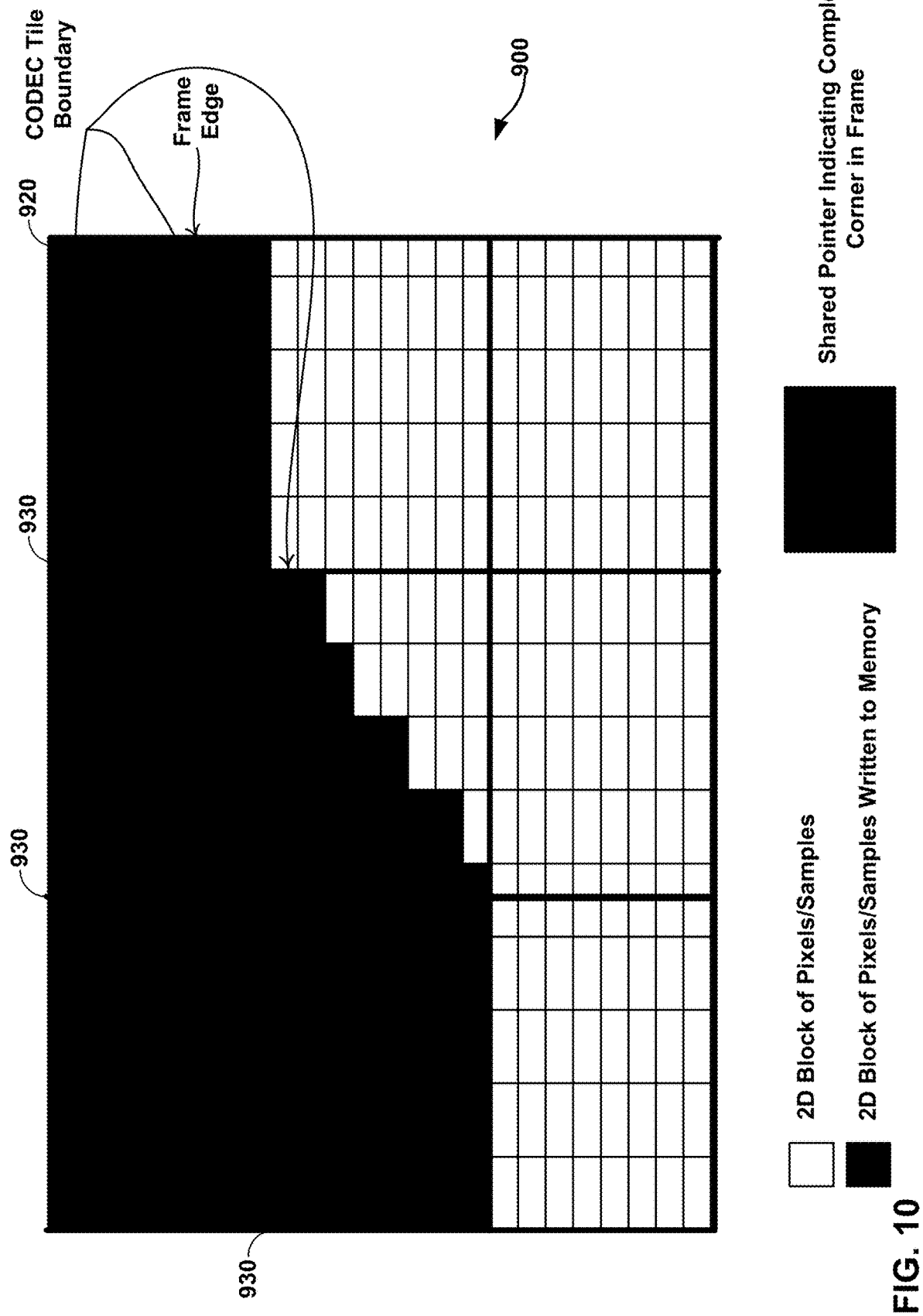
FIG. 10 is a conceptual diagram illustrating the third example of pixel/sample tracking in more detail.

FIG. 10 is a conceptual diagram illustrating the third example of pixel/sample tracking in more detail. In FIG. 10, the shared pointer that indicates the completion of the decoding of samples in a block row to the frame edge 920 is labeled as "F". The shared pointer that indicates the completion of decoding of samples is a previous tile to a tile edge 930 is labeled as Tp. The shared pointer that indicates the completion of decoding samples in a block row to the edge of a current tile is labeled as Tc. The core row pointers are generally labeled as Ri=R0, R1, R2, Rn.

In the example of FIG. 10, the core row pointers Ri are used to track the completion of the decoding samples in a block row of a current tile. The value written to core row pointers Ri can be any of the values discussed above that would indicate the level of completion in decoding, including an X, Y position (e.g., in samples) of the last block where decoding has been completed, and/or a number of blocks in the current tile where decoding has been completed.

The video decoding cores 400A-D may use the shared pointer 'F' to track the completion of decoding samples at the frame edge. A video decoding core may increment the value of the shared pointer F when the topmost core row pointer Ri being processed by the video decoding core the reaches frame edge 920. The value written to the shared pointer "F" may be the X, Y position of the lower right corner of the last block completed in the block row at the frame edge The video decoding cores 400A-D may use the shared pointer 'Tc' to track the completion of decoding samples at a current tile edge. A video decoding core may increment the value of the shared pointer Tc when the topmost core row pointer Ri being processed by the video decoding core reaches a current tile edge 930. The value written to the shared pointer "Tc" may be the X, Y position of the lower right corner of the last block completed in the block row at the current tile edge.

The video decoding cores 400A-D may use the shared pointer 'Tp' to track the completion of decoding samples of a previous tile. A video decoding core may increment the value of the shared pointer Tp when bottommost core row pointer Ri being processed by the video decoding core reaches a tile edge 930. The value written to the shared pointer "Tp" may be the X, Y position of the lower right corner of the last block completed in the block row at the current tile edge. In general, the shared pointer Tp is updated when an entire current codec tile has been decoded and stored to shared memory (e.g., DPB 410A-D).

As indicated above, the value written to the shared pointers F, Tc, and Tp may be the X, Y position of the lower right corner of the last block completed in the block row at the frame edge. However, other values may be written to the shared pointer to indicate where decoding has been completed. In general, in the example of FIG. 10, the X, Y position values indicate the position of the sample in the inside corner of each memory block, memory block row at a current tile edge, a tile edge, or a memory block row at a frame edge.

In summary, in the examples of FIG. 9 and FIG. 10, a video decoding core may be configured to track the completion of decoding the samples in a block row to a frame edge of the frame of video data, a current tile edge of the frame of video data, a previous tile of the frame of video data, and a number of blocks in a block row in the current tile of the frame of video data. The video decoding core may write data to a first shared pointer (e.g., F) that indicates completion of the block row to the frame edge of the frame of video data, write data to a second shared pointer (e.g., Tc) that indicates completion of the current tile edge of the frame of video data, write data to a third shared pointer (e.g., Tp) that indicates completion of the previous tile of the frame of video data, and write data to a respective core row pointer (e.g., Ri) that indicates completion of the number of blocks in the block row of the current tile of the frame of video data video data.

Figure 11:
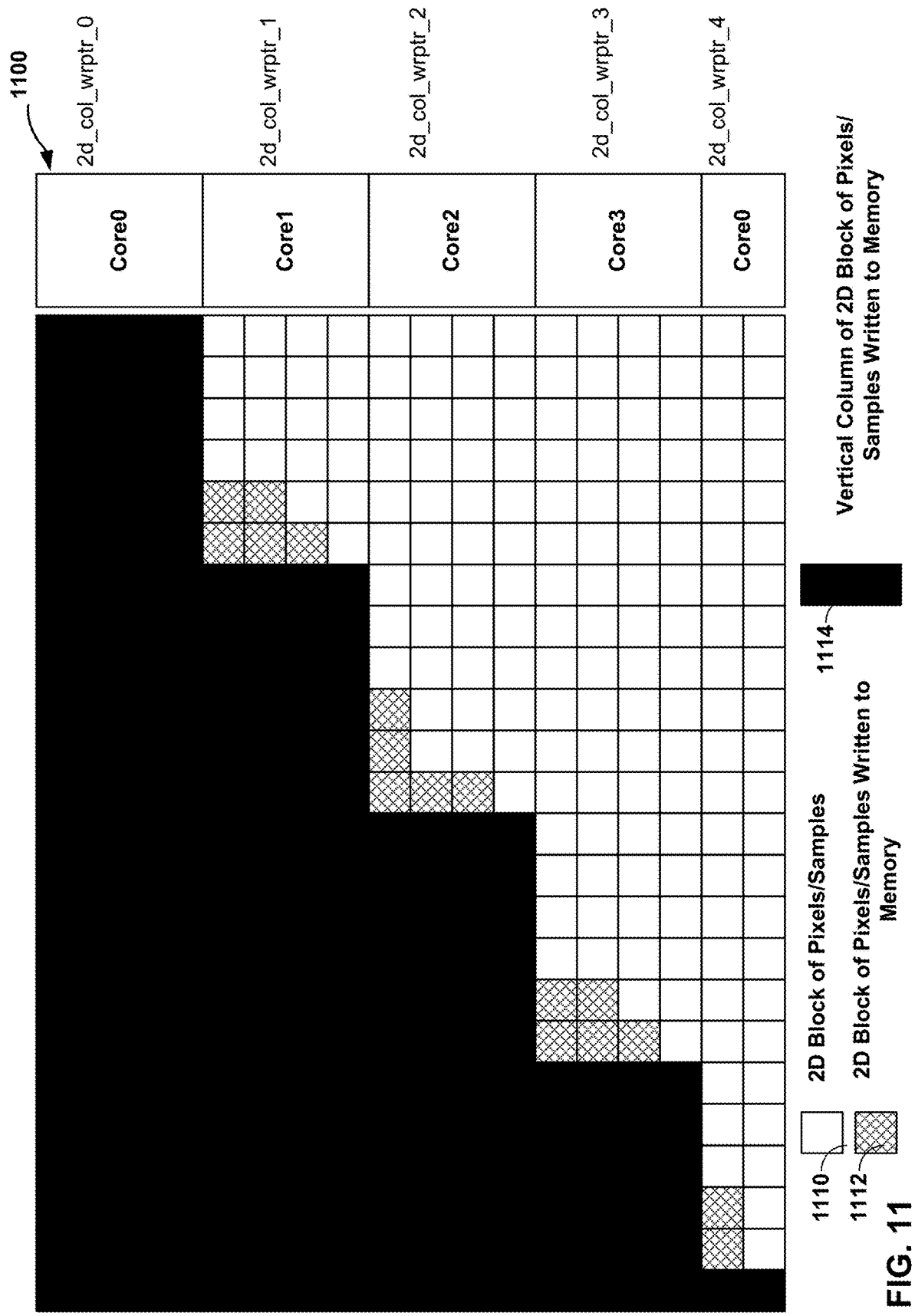
FIG. 11 is a conceptual diagram illustrating a fourth example of pixel/sample tracking according to the techniques of this disclosure.

FIG. 11 is a conceptual diagram illustrating a fourth example of pixel/sample tracking according to the techniques of this disclosure. The example of FIG. 11 is similar to that of FIG. 8. However, rather that tracking the completion of the decoding of samples in blocks of a block row using core row pointer, in FIG. 11, each of the video decoding cores may be configured to track the completion of decoding sample in a vertical columns in a row of vertical columns. Each vertical column may include a plurality of 2D blocks of pixels/samples to be written to memory.

As shown in FIG. 11, each of Core 0-Core 3 (e.g., video decoding cores 400A-D) are configured to decode four rows of memory blocks in frame 1100. Taken together, a rectangular grouping of four rows of memory blocks may form a memory tile. Each of the memory blocks 1110 and 1112 shown in FIG. 11 represent a fixed size of the smallest unit of sample data that is written to DPB memory 410A-D. The memory blocks 1110 are 2D blocks of samples that are to be written to DPB memory 410A-D. Memory blocks 1112 are 2D blocks of samples that have already been written to DPB memory 410A-D by one of Cores 0-3. Vertical column 1114 comprises multiples of memory blocks 1110 and/or 1112. In the techniques of FIG. 11, the number of pointers that are maintained by each video decoding are reduced relative to the example of FIG. 8 by grouping multiple memory blocks into vertical column 1114. In one example, the height of the vertical column 1114, in samples, is the same as the codec partition being decoded (e.g., the same as a CTU, LCU, superblock, macroblock, etc.).

For the example of a CTU, when a video decoding core is decoding one CTU row of samples, memory blocks in the processing region (e.g., the CTU row to the frame edge) that video decoding core are grouped together vertically. Each vertical column 1114 has the same height as the CTU, while the width of the vertical column 1114 may or may not be contiguous with the width of the CTU. The video decoding cores may track the completion of decoding for each vertical column 114. A local tracking of individual memory blocks 1112 is performed in the video decoding core itself (e.g., not stored to shared memory) before a complete vertical column 1114 is determined to be completed and a respective core pointer (e.g., 2d_col_wrptr_0 for Core 0) is updated. Similar to a core row pointer, the respective core pointer may either be updated with data that indicates the number of vertical columns in the row of vertical columns that have been completed or may indicate the X, Y position of the last vertical column that was decoded. While less granular than previous examples, the techniques of FIG. 11 may be implemented with fewer pointers, and thus with a lower memory requirement.

In summary, in the example of FIG. 11, a video decoding core may be configured to track completion of decoding samples in a number of vertical columns in a row of vertical columns, and write data to a respective core pointer that indicates completion of the number of vertical columns in the row of vertical columns.

Figure 12:
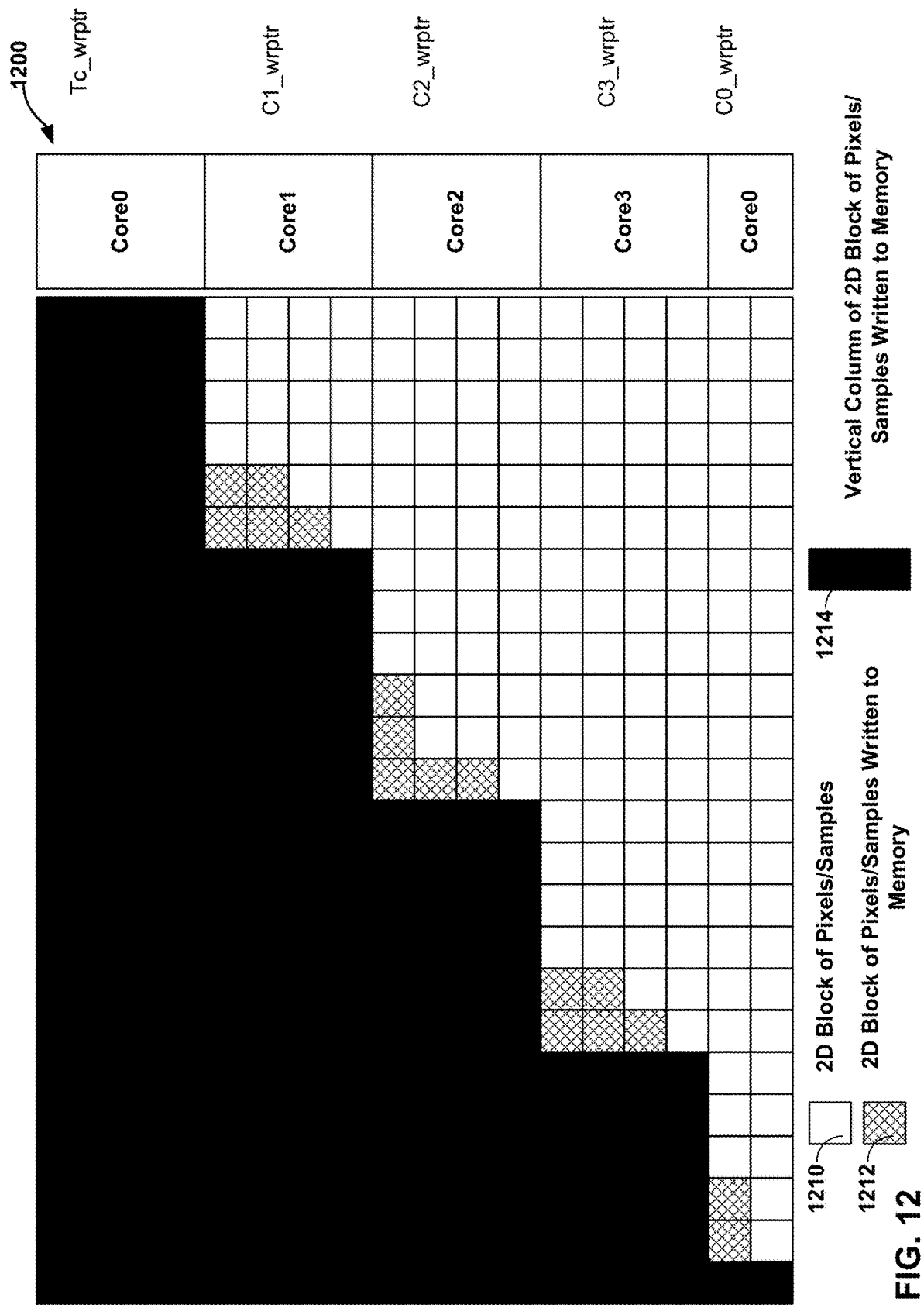
FIG. 12 is a conceptual diagram illustrating a fifth example of pixel/sample tracking according to the techniques of this disclosure.

FIG. 12 is a conceptual diagram illustrating a fifth example of pixel/sample tracking according to the techniques of this disclosure. The techniques of FIG. 12 are similar to those of FIGS. 9 and 10, in that the video decoding cores are configured to maintained shared points that track completion decoding to a frame edge, a current tile edge, and of a previous tile. However, rather than the lowest level of granularity of tracking being a memory block, the video decoding core may track completion of groups of memory blocks, such as the vertical columns discussed above with respect to FIG. 11.

As shown in FIG. 12, each of Core 0-Core 3 (e.g., video decoding cores 400A-D) are configured to decode a codec row (e.g., CTU/LCU/Superblock/macroblock) row of memory blocks in frame 1200. Each of the memory blocks 1210 and 1212 shown in FIG. 12 represent a fixed size of the smallest unit of sample data that is written to DPB memory 410A-D. The memory blocks 1210 are 2D blocks of samples that are to be written to DPB memory 910A-D. Memory blocks 1212 are 2D blocks of samples that have already been written to DPB memory 410A-D by one of Cores 0-3. The memory blocks in frame 1200 may not be contiguous with partitions of video data in the frame. Vertical column 1214 comprises multiples of memory blocks 1210 and/or 1212.

The techniques of FIG. 12 use the core pointers described above with reference to FIG. 11 to track the completion of decoding samples in vertical columns 1214. The techniques of FIG. 12, relative to FIG. 11 introduce additional shared pointers that are used to indicate the completion of the decoding of samples of a block row to a frame edge (e.g., a row of vertical columns 1214), of a current tile edge, and of a previous tile In the context of a codec that decodes a CTU, a video decoding core may be configured to track the completion of decoding samples for every ongoing CTU row (per core) at a vertical column (e.g., a plurality of vertical memory blocks) precision using core pointers and completed CTU Rows using shared pointers. Relative to the above techniques, the techniques of FIG. 12 may further reduce the amount of memory needed to store the shared pointers.

When each video decoding core is decoding a CTU row of video samples, all memory blocks within a region being processed by a video decoding core are grouped together vertically. Tracking is performed at the vertical column level. A video decoding core may use local tracking of individual memory blocks in the video decoding core itself before a complete vertical column is tracked to be completed and the pointer is written.

In the shared location, each core has one set of core pointers (e.g., C1_wrptr) for tracking video decoding core progress at the vertical column level. The rest of the frame can be tracked with three shared pointers progress at the frame edge, current codec tile edge, and previous codec tile. More detail is described below with reference to FIG. 13.

Figure 13:
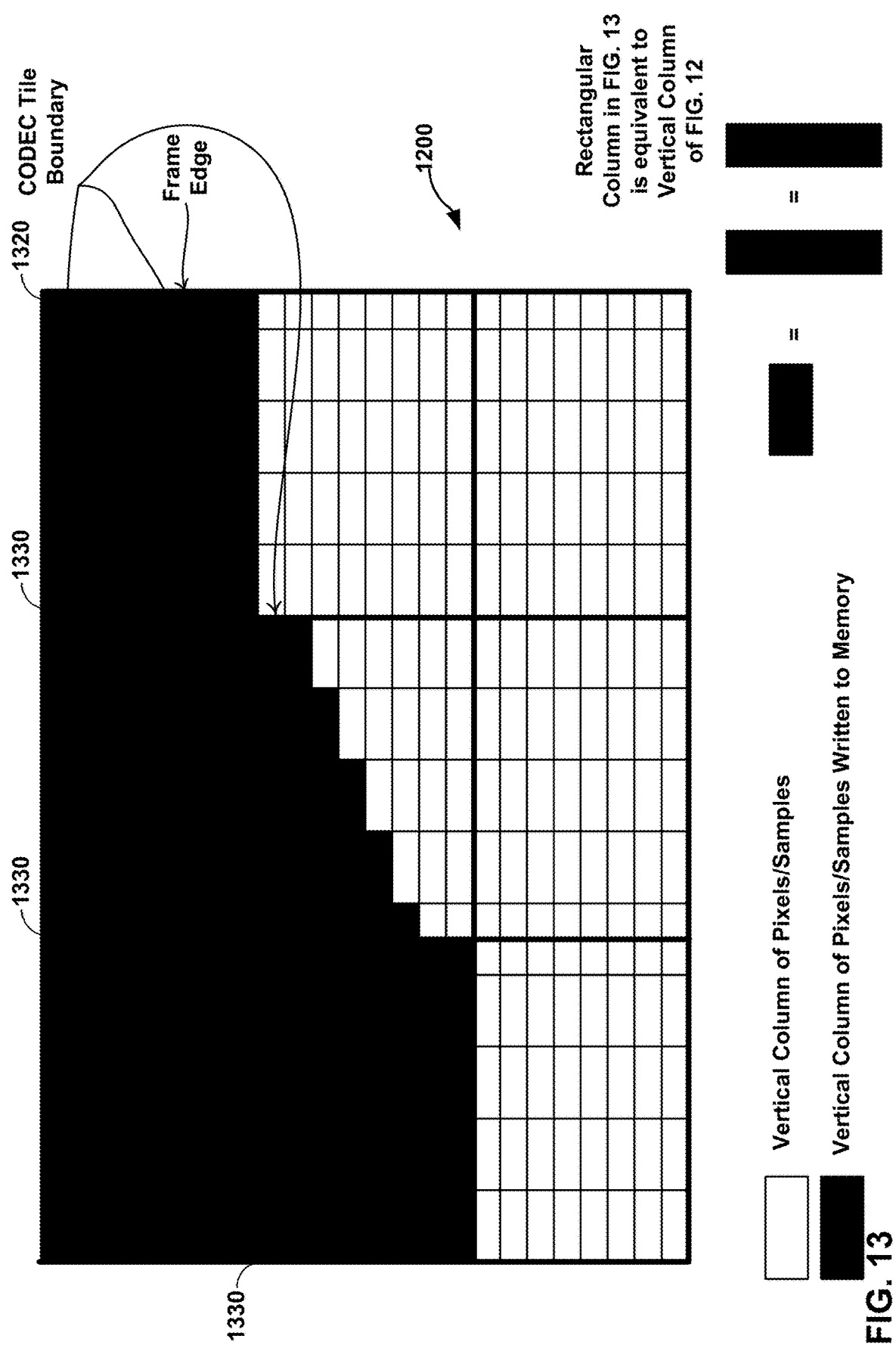
FIG. 13 is a conceptual diagram illustrating the fifth example of pixel/sample tracking in more detail.

FIG. 13 is a conceptual diagram illustrating the fifth example of pixel/sample tracking in more detail. In FIG. 13, the shared pointer that indicates the completion of the decoding of samples in a vertical column row (e.g., codec CTU row) to the frame edge 1320 is labeled as "F". The shared pointer that indicates the completion of decoding of samples is a previous tile to a tile edge 1330 is labeled as Tp. The shared pointer that indicates the completion of decoding samples in a vertical column row to the edge of a current tile is labeled as Tc. The core pointers are generally labeled as Ci=C0, C1, C2, Cn.

In the example of FIG. 13, the core pointers Ci are used to track the completion of the decoding samples in a vertical column row of a current tile. The value written to core pointers Ci can be any of the values discussed above that would indicate the level of completion in decoding, including an X, Y position (e.g., in samples) of the last vertical column where decoding has been completed, and/or a number of vertical columns in the current tile where decoding has been completed.

The video decoding cores 400A-D may use the shared pointer 'F' to track the completion of decoding samples at the frame edge. A video decoding core may increment the value of the shared pointer F when the topmost core pointer Ci being processed by the video decoding core the reaches frame edge 1320. The value written to the shared pointer "F" may be the X, Y position of the lower right corner of the last vertical column completed in the vertical column row at the frame edge The video decoding cores 400A-D may use the shared pointer 'Tc' to track the completion of decoding samples at a current tile edge. A video decoding core may increment the value of the shared pointer Tc when a topmost core pointer Ci being processed by the video decoding core reaches a current tile edge 930. The value written to the shared pointer "Tc" may be the X, Y position of the lower right corner of the last vertical column completed in the vertical column row at the current tile edge.

The video decoding cores 400A-D may use the shared pointer 'Tp' to track the completion of decoding samples of a previous tile. A video decoding core may increment the value of the shared pointer Tp when bottommost core pointer Ci being processed by the video decoding core reaches a tile edge 930. The value written to the shared pointer "Tp" may be the X, Y position of the lower right corner of the last vertical column completed in the vertical column row at the current tile edge. In general, the shared pointer Tp is updated when an entire current codec tile has been decoded and stored to shared memory (e.g., DPB 410A-D).

As indicated above, the value written to the shared pointers F, Tc, and Tp may be the X, Y position of the lower right corner of the last vertical column completed in the vertical column row at the frame edge. However, other values may be written to the shared pointer to indicate where decoding has been completed. In general, in the example of FIG. 13, the X, Y position values indicate the position of the sample in the inside corner of each memory vertical column, memory vertical column row at a current tile edge, a tile edge, or a memory vertical column row at a frame edge.

In general, a video decoding core may be configured to track the completion of decoding the samples in the block row to the frame edge of the frame of video data, the current tile edge of the frame of video data, the previous tile of the frame of video data, and a number of vertical columns of the current tile of video data. The video decoding core may be further configured to write data to a first shared pointer (F) that indicates completion of the block row to the frame edge of the frame of video data; write data to a second shared pointer (Tc) that indicates completion of the current tile edge of the frame of video data, write data to a third shared pointer (Tp) that indicates completion of the previous tile of the frame of video data, and write data to a respective core pointer (Ci) that indicates completion of the number of vertical columns of the current tile of video data.

FIG. 14 is a table 1400 illustrating example pointer statistics for various example techniques of the disclosure. The "BitMap" setup corresponds to the techniques described above with reference to FIG. 6. The "Rows (Frame)" setup corresponds to the techniques described above with reference to FIG. 8. The "Rows (Core)+Shared" setup corresponds to the techniques described above with reference to FIGS. 9-10. The "CTU Rows" setup corresponds to the techniques described above with reference to FIG. 11. The "Core+Shared" setup corresponds to the techniques described above with reference to FIGS. 12-13. The frame width (FW) and the frame height (FH) is in samples/pixels. The memory block width (uH) and the memory block width (uW) is also in samples/pixels. The variable ctu_H indicates the CTU height (e.g., could also be LCU, superblock, macroblock, etc.). The variable num_cores indicates the number of video decoding cores. In the examples above, num_cores=4. However, other numbers of cores may be used.

Figure 15:
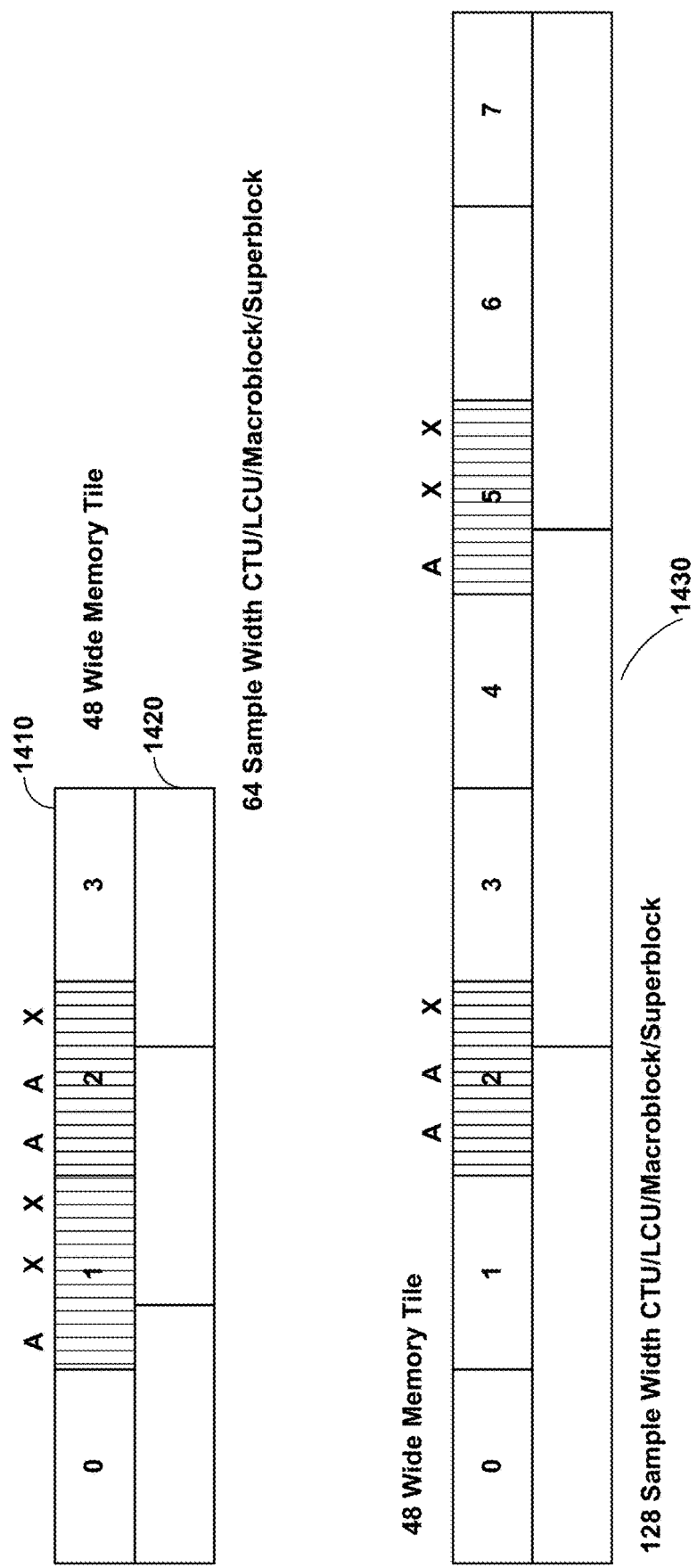
FIG. 15 is a conceptual diagram illustrating an example of partial tile tracking at block edges.

FIG. 15 is a conceptual diagram illustrating an example of partial tile tracking at block edges. Continuing on the previous problem, decoded sample data from a video decoding core written to shared memory (e.g., a DPB) in 2D memory bocks. If the codec tile width (e.g., a CTU width) is not integral multiple of these 2D memory blocks, then the memory blocks can remain partially filled at codec tile edges.

Even is a video decoding core is configured to track the decoding process as described above, if memory blocks are written out in partial manner, a video decoding core can write the same memory block twice to the shared memory before completion. This is because a first write of the memory block may occur at one side of a codec tile edge, while the second write of the memory block may occur at the other side of a codec tile edge once the new tile has begun to be decoded.

As such, before allowing a read of decoded sample values, the video decoding cores may further be configured to track partial completion of memory blocks and write data to the shared memory indicating either partial or full completion of the memory block.

As shown in FIG. 15, if a memory block is 48 samples wide, but a codec tile 1420 is 64 samples wide, both the memory block labeled "1" and the memory block labeled "2" overlap the boundary of the codec tile. A similar situation occurs for memory block "2" and memory block "5" for the 128 sample wide codec tile 1430.

As such, when used with codec tile 1420, e.g., when only a partial write of memory block 1 has occurred, sample values in position "A" may be available for use by other video decoding cores, but sample values in position "X" may not be available, as they have yet to be written to shared memory because they are across a codec tile boundary and have not been decoded yet.

In a situations where there is misalignment between a memory block and the codec tile, a video decoding core may be configured to determine if the requested decoded samples are within the first partial portion of the memory block (labeled A) or the second partial portion of the memory block (labeled X). If the decoded samples reside in the first partial portion of a memory block (A, X X), then the video decoding core may read the decoded samples values from a DPB, even if the data written to shared memory indicates that such a memory block has only been partially written out. Otherwise, if decoded samples reside in the second partial portion of the memory block (A, X X), then the video decoding core may only read out the decoded samples from the DPB if the data written to the shared memory indicates that the memory block has been fully written to the DPB (e.g., not partially written).

Figure 16:
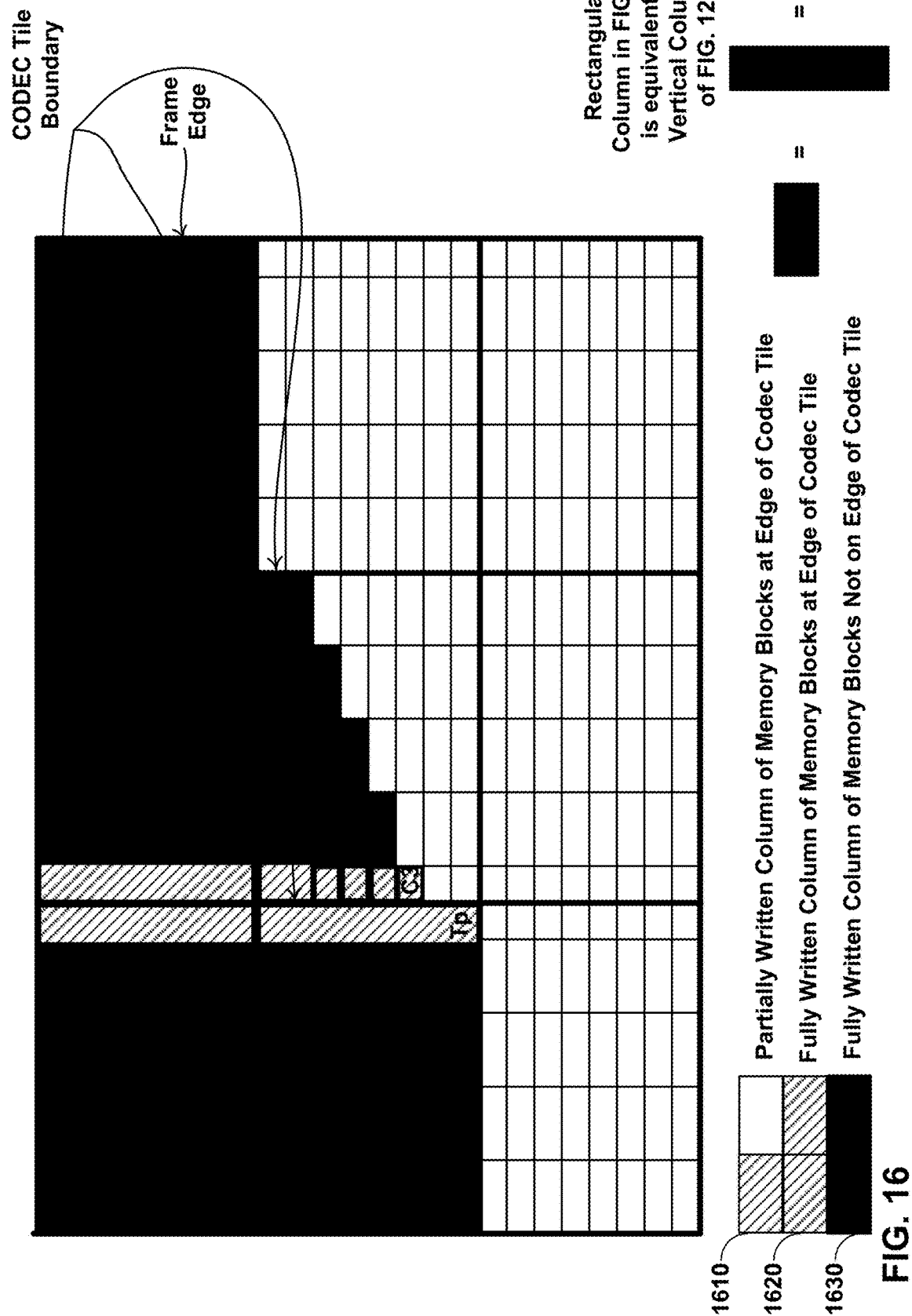
FIG. 16 is a conceptual diagram illustrating pixel/sample tracking in conjunction with partial tile tracking according to the techniques of this disclosure.

FIG. 16 is a conceptual diagram illustrating pixel/sample tracking in conjunction with partial tile tracking according to the techniques of this disclosure. FIG. 16 illustrates the same example as FIG. 13, but with the additional marking of memory blocks, columns, frame edges, current tile edges, or previous tiles as being partially written out. For example, memory columns 1610 show a partially written column of memory blocks at the edge of a codec tile, memory columns 1620 show a fully written column of memory blocks at the edge of a codec tile, and memory columns 1630 show a fully written column of memory blocks not at the edge of a codec tile Consider pointer 'Tp' in FIG. 16. Here the vertical column that gets written out is partial. So in addition to the pointers described in the examples above, a video decoding core may be configured to track additional information (e.g., an additional flag) that indicates if a particular completion of decoding of samples is partial write or not or not.

Figure 17:
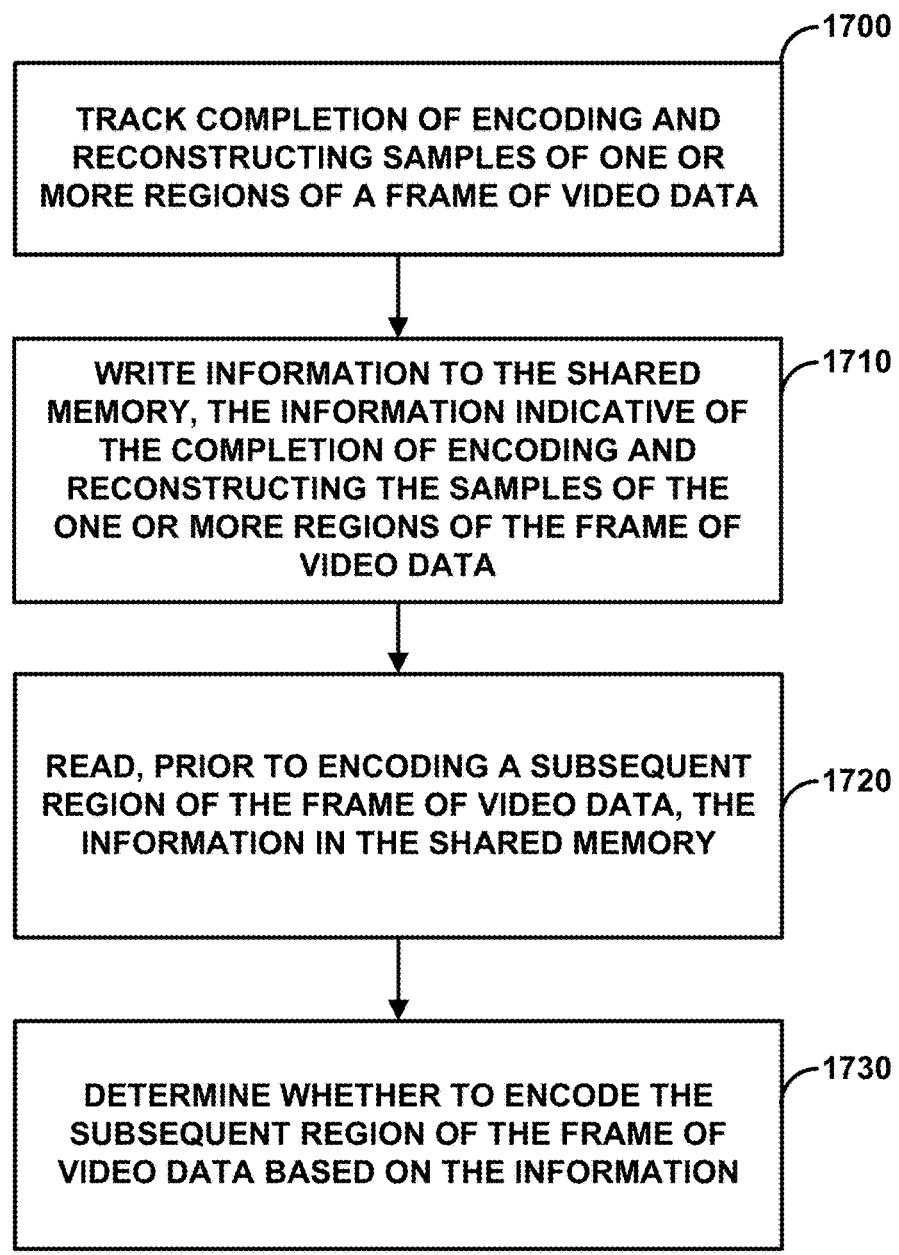
FIG. 17 is a flowchart showing an example decoding method according to the techniques of the disclosure.

FIG. 17 is a flowchart showing an example decoding method according to the techniques of the disclosure. The techniques of FIG. 17 may be performed by one or more structural units of video encoder 200.

In one example of the disclosure, video encoder 200 may be configured track completion of encoding and reconstructing samples of one or more regions of a frame of video data (1700). Video encoder 200 may write information to a shared memory, the information indicative of the completion of encoding and reconstructing the samples of the one or more regions of the frame of video data (1710). Video encoder 200 may further read, prior to encoding a subsequent region of the frame of video data, the information in the shared memory (1720), and determine whether to encode the subsequent region of the frame of video data based on the information (1730).

Figure 18:
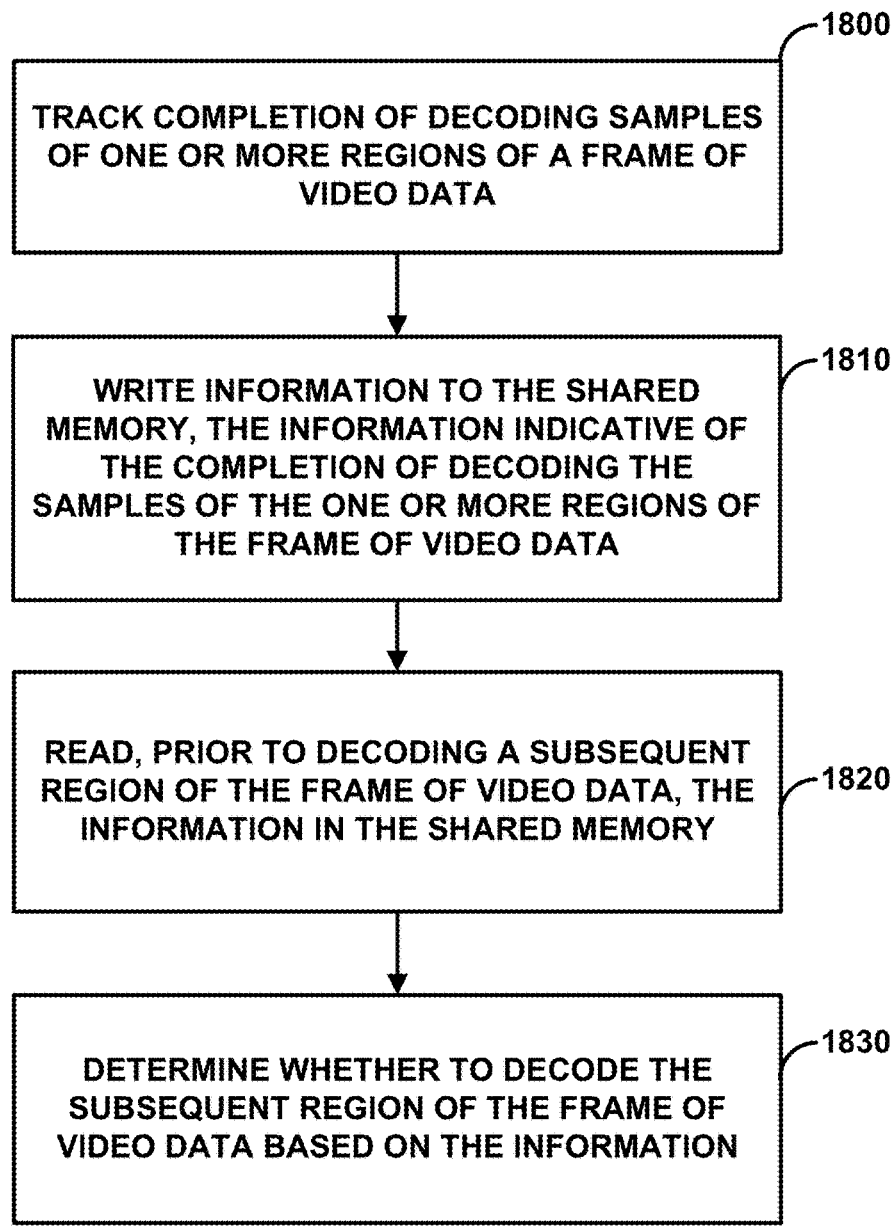
FIG. 18 is a flowchart showing another example decoding method according to the techniques of the disclosure.

FIG. 18 is a flowchart showing another example decoding method according to the techniques of the disclosure. The techniques of FIG. 18 may be performed by one or more structural units of video encoder 200.

In one example of the disclosure, video decoder 300 may be configured track completion of decoding samples of one or more regions of a frame of video data (1800). Video decoder 300 may write information to a shared memory, the information indicative of the completion of decoding the samples of the one or more regions of the frame of video data (1810). Video decoder 300 may further read, prior to decoding a subsequent region of the frame of video data, the information in the shared memory (1820), and determine whether to decode the subsequent region of the frame of video data based on the information (1830).

Other illustrative examples of the disclosure are described below.

Aspect 1—An apparatus configured to decode video data, the apparatus comprising: a shared memory; and one or more processors configured to execute a plurality of video decoding cores, each of the plurality of video decoding cores in communication with the shared memory, and at least one of plurality of video decoding cores configured to: track completion of decoding samples of one or more regions of a frame of video data; write information to the shared memory, the information indicative of the completion of decoding the samples of the one or more regions of the frame of video data; read, prior to decoding a subsequent region of the frame of video data, the information in the shared memory; and determine whether to decode the subsequent region of the frame of video data based on the information.

Aspect 2—The apparatus of Aspect 1, wherein the one or more regions include at least one of a block row to a frame edge of the frame of video data, a current tile edge of the frame of video data, a previous tile of the frame of video data, and a vertical column of a current tile of video data.

Aspect 3—The apparatus of Aspect 2, wherein to track the completion of decoding the samples of the one or more regions of the frame of video data, at least one of the plurality of video decoding cores is further configured to: track the completion of decoding the samples in the block row to the frame edge of the frame of video data, the current tile edge of the frame of video data, the previous tile of the frame of video data, and a number of vertical columns of the current tile of video data, and wherein to write the information to the shared memory, at least one of the plurality of video decoding cores is further configured to: write data to a first shared pointer that indicates completion of the block row to the frame edge of the frame of video data; write data to a second shared pointer that indicates completion of the current tile edge of the frame of video data; write data to a third shared pointer that indicates completion of the previous tile of the frame of video data; and write data to a respective core pointer that indicates completion of the number of vertical columns of the current tile of video data.

Aspect 4—The apparatus of Aspect 1, wherein to track the completion of decoding the samples of the one or more regions of the frame of video data, at least one of the plurality of video decoding cores is further configured to: track completion of decoding samples in a number of vertical columns in a row of vertical columns, and wherein to write the information to the shared memory, at least one of the plurality of video decoding cores is further configured to: write data to a respective core pointer that indicates completion of the number of vertical columns in the row of vertical columns.

Aspect 5—The apparatus of Aspect 1, wherein to track the completion of decoding the samples of the one or more regions of the frame of video data, at least one of the plurality of video decoding cores is further configured to: track the completion of decoding the samples in a block row to a frame edge of the frame of video data, a current tile edge of the frame of video data, a previous tile of the frame of video data, and a number of blocks in a block row in the current tile of the frame of video data, and wherein to write the information to the shared memory, at least one of the plurality of video decoding cores is further configured to: write data to a first shared pointer that indicates completion of the block row to the frame edge of the frame of video data; write data to a second shared pointer that indicates completion of the current tile edge of the frame of video data; write data to a third shared pointer that indicates completion of the previous tile of the frame of video data; and write data to a respective core row pointer that indicates completion of the number of blocks in the block row of the current tile of the frame of video data video data.

Aspect 6—The apparatus of Aspect 1, wherein to track the completion of decoding the samples of the one or more regions of the frame of video data, at least one of the plurality of video decoding cores is further configured to: track completion of decoding samples in a number of blocks in a block row of the frame of video data, and wherein to write the information to the shared memory, at least one of the plurality of video decoding cores is further configured to: write data to a respective core row pointer that indicates completion of the number of blocks in the block row of the frame of video data.

Aspect 7—The apparatus of Aspect 1, wherein to track the completion of decoding the samples of the one or more regions of the frame of video data, at least one of the plurality of video decoding cores is further configured to: track completion of decoding samples in each block of the frame of video data, and wherein to write the information to the shared memory, at least one of the plurality of video decoding cores is further configured to: write data to a respective pointer that indicates completion of the respective block of the frame of video data.

Aspect 8—The apparatus of any of Aspects 1-7, wherein to determine whether to decode the subsequent region of the frame of video data based on the information, at least one of the plurality of video decoding cores is further configured to: determine to decode the subsequent region of the frame of video data based on the information indicating that the samples of the one or more regions of the frame of video data needed for decoding the subsequent region are completed.

Aspect 9—The apparatus of any of Aspects 1-8, wherein to determine whether to decode the subsequent region of the frame of video data based on the information, at least one of the plurality of video decoding cores is further configured to: determine to not decode the subsequent region of the frame of video data based on the information indicating that the samples of the one or more regions of the frame of video data needed for decoding the subsequent region are not completed; wait a period of time; and determine, after the period of time, whether to decode the subsequent region of the frame of video data based on the information.

Aspect 10—The apparatus of any of Aspects 1-9, wherein the one or more regions of the frame of video data represent a memory tile that is not contiguous with a codec tile, and wherein at least one of the plurality of video decoding cores is further configured to: track partial completion of the memory tile; and write additional information to the shared memory that indicates partial completion of the memory tile.

Aspect 11—The apparatus of Aspect 10, wherein to determine whether to decode the subsequent region of the frame of video data based on the information, at least one of the plurality of video decoding cores is further configured to: determine whether to decode the subsequent region of the frame of video data further based on the information and the additional information that indicates partial completion of the memory tile.

Aspect 12—The apparatus of any of Aspects 1-11, wherein the apparatus is a mobile device, the apparatus further comprising: a receiver configured to receive the video data via a wireless communication standard.

Aspect 13—A method of decoding video data, the method comprising: tracking completion of decoding samples of one or more regions of a frame of video data; writing information to a shared memory, the information indicative of the completion of decoding the samples of the one or more regions of the frame of video data; reading, prior to decoding a subsequent region of the frame of video data, the information in the shared memory; and determining whether to decode the subsequent region of the frame of video data based on the information.

Aspect 14—The method of Aspect 13, wherein the one or more regions include at least one of a block row to a frame edge of the frame of video data, a current tile edge of the frame of video data, a previous tile of the frame of video data, and a vertical column of a current tile of video data.

Aspect 15—The method of Aspect 14, wherein tracking the completion of decoding the samples of the one or more regions of the frame of video data comprises tracking the completion of decoding the samples in the block row to the frame edge of the frame of video data, the current tile edge of the frame of video data, the previous tile of the frame of video data, and a number of vertical columns of the current tile of video data, and wherein writing the information to the shared memory comprises: writing data to a first shared pointer that indicates completion of the block row to the frame edge of the frame of video data; writing data to a second shared pointer that indicates completion of the current tile edge of the frame of video data; writing data to a third shared pointer that indicates completion of the previous tile of the frame of video data; and writing data to a respective core pointer that indicates completion of the number of vertical columns of the current tile of video data.

Aspect 16—The method of Aspect 13, wherein tracking the completion of decoding the samples of the one or more regions of the frame of video data comprises tracking completion of decoding samples in a number of vertical columns in a row of vertical columns, and wherein writing the information to the shared memory comprises writing data to a respective core pointer that indicates completion of the number of vertical columns in the row of vertical columns.

Aspect 17—The method of Aspect 13, wherein tracking the completion of decoding the samples of the one or more regions of the frame of video data comprises tracking the completion of decoding the samples in a block row to a frame edge of the frame of video data, a current tile edge of the frame of video data, a previous tile of the frame of video data, and a number of blocks in a block row in the current tile of the frame of video data, and wherein writing the information to the shared memory comprises: writing data to a first shared pointer that indicates completion of the block row to the frame edge of the frame of video data; writing data to a second shared pointer that indicates completion of the current tile edge of the frame of video data; writing data to a third shared pointer that indicates completion of the previous tile of the frame of video data; and writing data to a respective core row pointer that indicates completion of the number of blocks in the block row of the current tile of the frame of video data.

Aspect 18—The method of Aspect 13, wherein tracking the completion of decoding the samples of the one or more regions of the frame of video data comprises tracking completion of decoding samples in a number of blocks in a block row of the frame of video data, and wherein writing the information to the shared memory comprises writing data to a respective core row pointer that indicates completion of the number of blocks in the block row of the frame of video data.

Aspect 19—The method of Aspect 13, wherein tracking the completion of decoding the samples of the one or more regions of the frame of video data comprises tracking completion of decoding samples in each block of the frame of video data, and wherein writing the information to the shared memory comprises writing data to a respective pointer that indicates completion of the respective block of the frame of video data.

Aspect 20—The method of any of Aspects 13-19, wherein determining whether to decode the subsequent region of the frame of video data based on the information comprises determining to decode the subsequent region of the frame of video data based on the information indicating that the samples of the one or more regions of the frame of video data needed for decoding the subsequent region are completed.

Aspect 21—The method of any of Aspects 13-20, wherein determining whether to decode the subsequent region of the frame of video data based on the information comprises: determining to not decode the subsequent region of the frame of video data based on the information indicating that the samples of the one or more regions of the frame of video data needed for decoding the subsequent region are not completed; waiting a period of time; and determining, after the period of time, whether to decode the subsequent region of the frame of video data based on the information.

Aspect 22—The method of any of Aspects 13-21, wherein the one or more regions of the frame of video data represent a memory tile that is not contiguous with a codec tile, the method further comprising: tracking partial completion of the memory tile; and writing additional information to the shared memory that indicates partial completion of the memory tile.

Aspect 23—The method of Aspect 22, wherein determining whether to decode the subsequent region of the frame of video data based on the information comprises determining whether to decode the subsequent region of the frame of video data further based on the information and the additional information that indicates partial completion of the memory tile.

Aspect 24—The method of any of Aspects 13-23, further comprising: receiving the video data via a wireless communication standard.

Aspect 25—An apparatus configured to encode video data, the apparatus comprising: a shared memory; and one or more processors configured to execute a plurality of video encoding cores, each of the plurality of video encoding cores in communication with the shared memory, and at least one of plurality of video encoding cores configured to: track completion of encoding and reconstructing samples of one or more regions of a frame of video data; write information to the shared memory, the information indicative of the completion of encoding and reconstructing the samples of the one or more regions of the frame of video data; read, prior to encoding a subsequent region of the frame of video data, the information in the shared memory; and determine whether to encode the subsequent region of the frame of video data based on the information.

Aspect 26—A method of encoding video data, the method comprising: tracking completion of encoding samples of one or more regions of a frame of video data; writing information to a shared memory, the information indicative of the completion of encoding the samples of the one or more regions of the frame of video data; reading, prior to encoding a subsequent region of the frame of video data, the information in the shared memory; and determining whether to encode the subsequent region of the frame of video data based on the information.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode video data, the apparatus comprising:
   a shared memory; and
   one or more processors configured to execute a plurality of video decoding cores, each of the plurality of video decoding cores in communication with the shared memory,
   wherein a first video decoding core among the plurality of video decoding cores is configured to:
      set, in the shared memory, first information, the first information indicating that samples of a first region of a frame of video data have not been decoded; and
   wherein a second video decoding core, that is a different video decoding core from the first video decoding core, among the plurality of video decoding cores, is configured to:
      read, prior to decoding a first subsequent region of the frame of video data, the first information in the shared memory, the first subsequent region being coded after the first region; and
      determine to not decode the first subsequent region of the frame of video data based on the first information being indicative of the samples, needed for decoding the first subsequent region, not being decoded.

2. The apparatus of claim 1, wherein the first region of the frame of video data includes at least one of a block row to a frame edge of the frame of video data, a current tile edge of the frame of video data, a previous tile of the frame of video data, or a vertical column of a current tile of video data.

3. The apparatus of claim 2, wherein the first video decoding core is further configured to:
   track decoding of the samples in the block row to the frame edge of the frame of video data, the current tile edge of the frame of video data, the previous tile of the frame of video data, and a number of vertical columns of the current tile of video data;
   write data to a first shared pointer that indicates completion of the block row to the frame edge of the frame of video data;
   write data to a second shared pointer that indicates completion of the current tile edge of the frame of video data;
   write data to a third shared pointer that indicates completion of the previous tile of the frame of video data; and
   write data to a respective core pointer that indicates completion of the number of vertical columns of the current tile of video data.

4. The apparatus of claim 1, wherein the first video decoding core is further configured to:
   track decoding of the samples in a number of vertical columns in a row of vertical columns, and
   write data to a respective core pointer that indicates completion of the number of vertical columns in the row of vertical columns.

5. The apparatus of claim 1, wherein the first video decoding core is further configured to:
   track decoding of the samples in a block row to a frame edge of the frame of video data, a current tile edge of the frame of video data, a previous tile of the frame of video data, and a number of blocks in a block row in a current tile of the frame of video data;

write data to a first shared pointer that indicates completion of the block row to the frame edge of the frame of video data;
write data to a second shared pointer that indicates completion of the current tile edge of the frame of video data;
write data to a third shared pointer that indicates completion of the previous tile of the frame of video data; and
write data to a respective core row pointer that indicates completion of the number of blocks in the block row of the current tile of the frame of video data video data.

6. The apparatus of claim 1, wherein the first video decoding core is further configured to:
track decoding of the samples in a number of blocks in a block row of the frame of video data; and
write data to a respective core row pointer that indicates completion of the number of blocks in the block row of the frame of video data.

7. The apparatus of claim 1, wherein the first video decoding core is further configured to:
track decoding of the samples in each block of the frame of video data; and
write data to a respective pointer that indicates completion of a respective block of the frame of video data.

8. The apparatus of claim 1, wherein second video decoding core is further configured to:
determine to decode a second subsequent region of the frame of video data based on second information indicating that the samples of a second region of a frame, needed for decoding the second subsequent region, are completed, the second subsequent region being coded after the second region.

9. The apparatus of claim 1, wherein second video decoding core is further configured to:
wait a period of time; and
determine, after the period of time, whether to decode the first subsequent region of the frame of video data based on second information indicating that samples of the first region of the frame of video data have been decoded.

10. The apparatus of claim 1, wherein the first region of the frame of video data represents a memory tile that is not contiguous with a codec tile, and wherein the first video decoding core is further configured to:
track that the memory tile is partially decoded; and
write additional information to the shared memory that indicates that the memory tile is partially decoded.

11. The apparatus of claim 10, wherein the second video decoding core is further configured to:
determine to decode the first subsequent region of the frame of video data based on the additional information that indicates that the memory tile is partially decoded.

12. The apparatus of claim 1, wherein the apparatus is a mobile device, the apparatus further comprising:
a receiver configured to receive the video data via a wireless communication standard.

13. A method of decoding video data, the method comprising:
setting, in a shared memory by a first video decoding core, first information, the first information indicating that samples of a first region of a frame of video data have not been decoded;
reading, by a second video decoding core and prior to decoding a first subsequent region of the frame of video data, the first information in the shared memory, the first subsequent region being coded after the first region; and
determining, by the second video decoding core, to not decode the first subsequent region of the frame of video data based on the first information being indicative of the samples, needed for decoding the first subsequent region, not being decoded.

14. The method of claim 13, wherein the first region of the frame of video data includes at least one of a block row to a frame edge of the frame of video data, a current tile edge of the frame of video data, a previous tile of the frame of video data, or a vertical column of a current tile of video data.

15. The method of claim 14, further comprising:
tracking, by the first video decoding core, decoding of the samples in the block row to the frame edge of the frame of video data, the current tile edge of the frame of video data, the previous tile of the frame of video data, and a number of vertical columns of the current tile of video data;
writing, by the first video decoding core, data to a first shared pointer that indicates completion of the block row to the frame edge of the frame of video data;
writing, by the first video decoding core, data to a second shared pointer that indicates completion of the current tile edge of the frame of video data;
writing, by the first video decoding core, data to a third shared pointer that indicates completion of the previous tile of the frame of video data; and
writing, by the first video decoding core, data to a respective core pointer that indicates completion of the number of vertical columns of the current tile of video data.

16. The method of claim 13, further comprising:
tracking, by the first video decoding core, decoding of the samples in a number of vertical columns in a row of vertical columns, and
writing, by the first video decoding core, data to a respective core pointer that indicates completion of the number of vertical columns in the row of vertical columns.

17. The method of claim 13, further comprising:
tracking, by the first video decoding core, decoding of the samples in a block row to a frame edge of the frame of video data, a current tile edge of the frame of video data, a previous tile of the frame of video data, and a number of blocks in a block row in a current tile of the frame of video data;
writing, by the first video decoding core, data to a first shared pointer that indicates completion of the block row to the frame edge of the frame of video data;
writing, by the first video decoding core, data to a second shared pointer that indicates completion of the current tile edge of the frame of video data;
writing, by the first video decoding core, data to a third shared pointer that indicates completion of the previous tile of the frame of video data; and
writing, by the first video decoding core, data to a respective core row pointer that indicates completion of the number of blocks in the block row of the current tile of the frame of video data video data.

18. The method of claim 13, further comprising:
tracking, by the first video decoding core, decoding of the samples in a number of blocks in a block row of the frame of video data; and
writing, by the first video decoding core, data to a respective core row pointer that indicates completion of the number of blocks in the block row of the frame of video data.

19. The method of claim 13, further comprising:
tracking, by the first video decoding core, decoding of the samples in each block of the frame of video data; and
writing, by the first video decoding core, data to a respective pointer that indicates completion of a respective block of the frame of video data.

20. The method of claim 13, further comprising:
determining, by the second video decoding core, to decode a second subsequent region of the frame of video data based on second information indicating that the samples of a second region of the frame, needed for decoding the second subsequent region, are completed, the second subsequent region being coded after the second region.

21. The method of claim 13, further comprising:
waiting, by the second video decoding core, a period of time; and
determining, by the second video decoding core and after the period of time, whether to decode the first subsequent region of the frame of video data based on second information indicating that samples of the first region of the frame of video data have been decoded.

22. The method of claim 13, wherein the first region of the frame of video data represents a memory tile that is not contiguous with a codec tile, the method further comprising:
tracking, by the first video decoding core, that the memory tile is partially decoded; and
writing, by the first video decoding core, additional information to the shared memory that indicates that the memory tile is partially decoded.

23. The method of claim 22, further comprising:
determining, by the second video decoding core, whether to decode the first subsequent region of the frame of video data based on the additional information that indicates that the memory tile is partially decoded.

24. The method of claim 13, further comprising:
receiving the video data via a wireless communication standard.

25. An apparatus configured to encode video data, the apparatus comprising:
a shared memory; and
one or more processors configured to execute a plurality of video encoding cores, each of the plurality of video encoding cores in communication with the shared memory,
wherein a first video encoding core among the plurality of video encoding cores is configured to:
set, in the shared memory, first information, the first information indicating that samples of a first region of a frame of video data have not been encoded; and
wherein a second video encoding core, that is a different video encoding core from the first video encoding core, among the plurality of video encoding cores, is configured to:
read, prior to encoding a first subsequent region of the frame of video data, the first information in the shared memory, the first subsequent region being coded after the first region; and
determine to not encode the first subsequent region of the frame of video data based on the first information being indicative of the samples, needed for encoding the first subsequent region, not being encoded.

26. A method of encoding video data, the method comprising:
setting, in a shared memory by a first video encoding core, first information, the first information indicating that samples of a first region of a frame of video data have not been encoded;
reading, by a second video encoding core and prior to encoding a first subsequent region of the frame of video data, the first information in the shared memory, the first subsequent region being coded after the first region; and
determining, by the second video encoding core, to not decode the first subsequent region of the frame of video data based on the first information being indicative of the samples, needed for encoding the first subsequent region, not being encoded.

* * * * *